United States Patent
Kumar et al.

(10) Patent No.: US 11,706,162 B2
(45) Date of Patent: Jul. 18, 2023

(54) DYNAMIC, DISTRIBUTED, AND SCALABLE SINGLE ENDPOINT SOLUTION FOR A SERVICE IN CLOUD PLATFORM

(71) Applicant: SAP SE, Walldorf (DE)

(72) Inventors: Dinesh Kumar, Bangalore (IN);
Vinayak Jadhav, Kamataka (IN);
Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 499 days.

(21) Appl. No.: 16/658,382

(22) Filed: Oct. 21, 2019

(65) Prior Publication Data
US 2021/0119940 A1    Apr. 22, 2021

(51) Int. Cl.
*H04L 12/931* (2013.01)
*H04L 12/947* (2013.01)
(Continued)

(52) U.S. Cl.
CPC .......... *H04L 49/70* (2013.01); *G06F 9/45558* (2013.01); *G06F 11/1443* (2013.01); *G06F 16/285* (2019.01); *H04L 45/28* (2013.01); *H04L 45/586* (2013.01); *H04L 49/252* (2013.01); *H04L 49/602* (2013.01);
(Continued)

(58) Field of Classification Search
CPC ..... H04L 49/70; H04L 49/252; H04L 49/602; H04L 61/1511; H04L 45/28; H04L 45/586; G06F 9/45558; G06F 11/1443; G06F 16/285; G06F 2009/45595; G06F 2201/80; G06F 11/301; G06F 11/2025;
(Continued)

(56) References Cited

U.S. PATENT DOCUMENTS 8,346,929 B1 * 1/2013 Lai .......................... H04L 67/51
709/226
8,953,439 B1 * 2/2015 Lin ......................... H04L 45/54
370/219
(Continued)

FOREIGN PATENT DOCUMENTS

AU    2013249152 B2 *  4/2016  ......... G06F 9/45558
CN     101410819 A  *  4/2009  ............ H04J 3/1617
(Continued)

*Primary Examiner* — David R Lazaro
*Assistant Examiner* — Berhanu Shitayewoldetadik
(74) *Attorney, Agent, or Firm* — Buckley, Maschoff & Talwalkar LLC

(57) ABSTRACT

A first forwarding VM may execute in a first availability zone and have a first IP address. Similarly, a second forwarding VM may execute in a second availability zone and have a second IP address. The first and second IP addresses may be recorded with a cloud DNS web service of a cloud provider such that both receive requests from applications directed to a particular DNS name acting as a single endpoint. A service cluster may include a master VM node and a standby VM node. An IPtable in each forwarding VM may forward a request having a port value to a cluster port value associated with the master VM node. Upon a failure of the master VM node, the current standby VM node may be promoted to execute in master mode and the IPtables may be updated to now forward requests having the port value to a cluster port value associated with the newly promoted master VM node (which was previously the standby VM node).

15 Claims, 33 Drawing Sheets

(51) Int. Cl.
*H04L 29/12* (2006.01)
*G06F 9/455* (2018.01)
*G06F 16/28* (2019.01)
*G06F 11/14* (2006.01)
*H04L 12/24* (2006.01)
*H04L 12/26* (2006.01)
*H04L 49/00* (2022.01)
*H04L 49/60* (2022.01)
*H04L 49/25* (2022.01)
*H04L 45/586* (2022.01)
*H04L 45/28* (2022.01)
*H04L 67/1034* (2022.01)
*H04L 61/4511* (2022.01)
*H04L 45/00* (2022.01)

(52) U.S. Cl.
CPC ...... *H04L 61/4511* (2022.05); *H04L 67/1034* (2013.01); *G06F 2009/45595* (2013.01); *G06F 2201/80* (2013.01); *H04L 45/22* (2013.01)

(58) Field of Classification Search
CPC ............. G06F 11/2035; G06F 11/2038; G06F 11/2097; G06F 2201/815; G06F 11/2048
USPC .......................................................... 709/226
See application file for complete search history.

(56) References Cited

U.S. PATENT DOCUMENTS

| | | | |
|---|---|---|---|
| 9,164,864 B1* | 10/2015 | Novick | G06F 11/3055 |
| 9,210,067 B1* | 12/2015 | Agarwal | H04L 45/22 |
| 9,985,875 B1* | 5/2018 | Srinath | G06F 11/20 |
| 10,210,058 B1* | 2/2019 | Srinath | G06F 11/1451 |
| 10,445,509 B2* | 10/2019 | Thota | G06F 21/602 |
| 10,454,758 B2* | 10/2019 | Boutros | H04L 41/0668 |
| 10,491,546 B2* | 11/2019 | Gopalakrishnan | G06F 9/455 |
| 10,999,125 B1* | 5/2021 | Srinath | H04L 11/20 |
| 2002/0194015 A1* | 12/2002 | Gordon | G06F 16/273 705/1.1 |
| 2005/0044197 A1* | 2/2005 | Lai | H04L 67/02 709/223 |
| 2005/0201272 A1* | 9/2005 | Wang | H04L 45/46 370/216 |
| 2008/0181241 A1* | 7/2008 | Regan | H04L 41/0613 370/401 |
| 2010/0042715 A1* | 2/2010 | Tham | H04L 67/1034 714/4.11 |
| 2010/0100957 A1* | 4/2010 | Graham | G06Q 10/107 726/22 |
| 2010/0322255 A1* | 12/2010 | Hao | H04L 49/70 370/398 |
| 2012/0113835 A1* | 5/2012 | Alon | H04L 45/58 370/252 |
| 2012/0127855 A1* | 5/2012 | Alon | H04L 45/28 370/218 |
| 2012/0215779 A1* | 8/2012 | Lipstone | G06F 16/24556 707/E17.089 |
| 2013/0091335 A1* | 4/2013 | Mulcahy | G06F 11/2097 714/E11.132 |
| 2013/0227558 A1* | 8/2013 | Du | G06F 9/5077 718/1 |
| 2013/0297757 A1* | 11/2013 | Han | H04L 41/40 709/222 |
| 2014/0019959 A1* | 1/2014 | Dodgson | G06F 9/455 718/1 |
| 2014/0059226 A1* | 2/2014 | Messerli | H04L 67/51 709/226 |
| 2014/0101652 A1* | 4/2014 | Kamble | G06F 8/656 717/171 |
| 2014/0189235 A1* | 7/2014 | Obligacion | G06F 3/0689 711/164 |
| 2014/0269746 A1* | 9/2014 | Chinthalapati | H04L 45/50 370/409 |
| 2014/0281026 A1* | 9/2014 | Guo | G06F 9/5077 709/240 |
| 2014/0337500 A1* | 11/2014 | Lee | H04L 63/0272 709/223 |
| 2014/0344424 A1* | 11/2014 | Sato | G06F 9/45558 709/221 |
| 2015/0009804 A1* | 1/2015 | Koponen | H04L 41/0695 370/219 |
| 2015/0049632 A1* | 2/2015 | Padmanabhan | H04L 67/34 370/254 |
| 2015/0052262 A1* | 2/2015 | Chanda | H04L 45/586 709/245 |
| 2015/0063360 A1* | 3/2015 | Thakkar | H04L 49/3009 370/400 |
| 2015/0063364 A1* | 3/2015 | Thakkar | H04L 12/4633 370/401 |
| 2015/0161226 A1* | 6/2015 | Lipstone | H04N 21/24 707/603 |
| 2015/0347250 A1* | 12/2015 | Kim | G06F 11/2048 714/4.11 |
| 2015/0378763 A1* | 12/2015 | Hassine | G06F 8/61 718/1 |
| 2016/0043929 A1* | 2/2016 | Hao | H04L 49/70 370/398 |
| 2016/0127206 A1* | 5/2016 | Du | H04L 67/52 709/224 |
| 2016/0191304 A1* | 6/2016 | Muller | H04L 45/586 370/220 |
| 2016/0191611 A1* | 6/2016 | Srinivasan | G06F 8/65 709/201 |
| 2016/0259692 A1* | 9/2016 | Ramamurthi | G06F 16/2272 |
| 2017/0075779 A1* | 3/2017 | Grimaldi | G06F 11/1471 |
| 2017/0085430 A1* | 3/2017 | Friedman | H04L 41/046 |
| 2017/0085488 A1* | 3/2017 | Bhattacharya | H04L 41/122 |
| 2017/0118041 A1* | 4/2017 | Bhattacharya | H04L 41/0895 |
| 2017/0124659 A1* | 5/2017 | Drennan, III | G06Q 40/08 |
| 2017/0317954 A1* | 11/2017 | Masurekar | H04L 45/586 |
| 2017/0324665 A1* | 11/2017 | Johnsen | H04L 47/32 |
| 2018/0062933 A1* | 3/2018 | Hira | G06F 9/45533 |
| 2018/0063193 A1* | 3/2018 | Chandrashekhar | G06F 15/177 |
| 2018/0176093 A1* | 6/2018 | Katz | G06F 11/2097 |
| 2018/0210910 A1* | 7/2018 | Collins | G06F 16/24524 |
| 2018/0359145 A1* | 12/2018 | Bansal | H04L 41/0894 |
| 2019/0013963 A1* | 1/2019 | Papo | G06F 9/455 |
| 2019/0028569 A1* | 1/2019 | Keller | H04L 67/63 |
| 2019/0065510 A1* | 2/2019 | Pradeep | H04L 67/06 |
| 2019/0238498 A1* | 8/2019 | Cleary | H04L 63/08 |
| 2019/0280964 A1* | 9/2019 | Michael | H04L 43/0864 |
| 2019/0342390 A1* | 11/2019 | Iancu | H04L 67/62 |
| 2019/0349127 A1* | 11/2019 | K | H04L 49/3063 |
| 2021/0051077 A1* | 2/2021 | Dempo | H04L 41/12 |
| 2022/0103518 A1* | 3/2022 | LaChance | H04L 63/0236 |

FOREIGN PATENT DOCUMENTS

| | | | | |
|---|---|---|---|---|
| CN | 108228581 A | * | 6/2018 | ............. G06F 16/23 |
| CN | 109451084 A | * | 3/2019 | .......... H04L 61/1511 |
| CN | 109451084 B | * | 12/2020 | .......... H04L 61/1511 |
| WO | WO-2005104650 A2 | * | 11/2005 | .......... G06F 11/2038 |
| WO | WO-2014067330 A1 | * | 5/2014 | ............. G06F 8/656 |
| WO | WO-2014067335 A1 | * | 5/2014 | .......... G06F 11/1433 |
| WO | WO-2016073625 A2 | * | 5/2016 | .......... G06F 11/1435 |
| WO | WO-2020057411 A1 | * | 3/2020 | ............. H04L 45/74 |

* cited by examiner

DYNAMIC, DISTRIBUTED, AND SCALABLE SINGLE ENDPOINT SOLUTION FOR A SERVICE IN CLOUD PLATFORM

BACKGROUND

An enterprise may utilize applications or services executing in a cloud computing environment. For example, a business might utilize applications that execute at a data center to process purchase orders, human resources tasks, payroll functions, etc. Implementing an application as a service in a cloud computing environment may simplify the design of an application and improve the utilization of resources for that application. In some cases, a Relational Database Management System ("RDBMS") as a service might be provided in such a cloud computing environment. It can be difficult, however, to ensure that such a system can meet high availability standards and implement a single endpoint solution using traditional approaches.

It would therefore be desirable to provide a single endpoint solution for a service in a cloud-based computing environment in a secure, automatic, and accurate manner.

SUMMARY

According to some embodiments, a first forwarding VM may execute in a first availability zone and have a first IP address. Similarly, a second forwarding VM may execute in a second availability zone and have a second IP address. The first and second IP addresses may be recorded with a cloud DNS web service of a cloud provider such that both receive requests from applications directed to a particular DNS name acting as a single endpoint. A service cluster may include a master VM node and a standby VM node. An IPtable in each forwarding VM may forward a request having a port value to a cluster port value associated with the master VM node. Upon a failure of the master VM node, the current standby VM node will be promoted to execute in master mode and the IPtables may be updated to now forward requests having the port value to a cluster port value associated with the newly promoted master VM node (which was previously the standby VM node).

Some embodiments comprise: means for executing a first forwarding VM in a first availability zone and having a first IP address; means for executing a second forwarding VM in a second availability zone and having a second IP address; means for recording the first and second IP addresses with a cloud DNS web service of a cloud provider such that both receive requests from applications directed to a particular DNS name acting as a single endpoint; means for providing a RDBMS as a service cluster, including a master RDBMS VM node and a standby RDBMS VM node; means for forwarding, by an IPtable in each forwarding VM, a request having a port value to a cluster port value associated with the master RDBMS VM node; means for detecting a failure of the master RDBMS VM node; and responsive to said detecting, means for promoting the second RDMS VM node (standby) to execute in the master mode and means for updating the IPtables to forward requests having the port value to a cluster port value associated with the second RDBMS VM node (the newly promoted master RDBMS VM node).

Yet other embodiments comprise: means for executing a first RDBMS VM node and a first controller node in a first availability zone; means for executing a second RDBMS VM node and a second controller in a second availability zone; means for executing a third controller node in a third availability zone; means for obtaining a first SPIP for the master RDBMS VM node; means for obtaining a second SPIP for the standby RDBMS VM node; means for recording the first and second SPIP addresses with a cloud DNS web service of a cloud provider; means for creating a rule in an IPtable of the second RDBMS VM node such that an OS rejects requests; means for detecting a failure of the master RDBMS VM node; and responsive to said detecting, means for promoting the second RDBMS VM node (standby) to execute in master mode and means for: (i) floating the first SPIP from the master RDBMS VM node to the controller node in the first availability zone, and (ii) deleting the rule in the IPtable of the second RDBMS VM node (which is the newly promoted master RDBMS node).

Some technical advantages of some embodiments disclosed herein are improved systems and methods to provide a single endpoint solution for a service in a cloud-based computing environment in a secure, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The adoption of cloud applications has substantially increased in recent years. With such an approach, developers do not need to worry about infrastructure or runtimes that are required for an application. Cloud adoption may also result in reduced capital expenditures and maintenance costs while also providing more flexibility and scalability. This in turn increases the importance of Platforms-as-a-Service ("PaaS") products in this space.

PaaS products provide a platform that lets customers develop, run, and manage applications without the complexity of building and maintaining the infrastructure typically associated with developing and launching an application. It can instead be viewed as a product, where the consumer can control software deployment with minimal configuration options, and the provider provides the networks, servers, storage, Operating System ("OS"), middleware (e.g., Java runtime, .NET runtime, integration, etc.), databases and other services to host the consumer's application.

Figure 1:
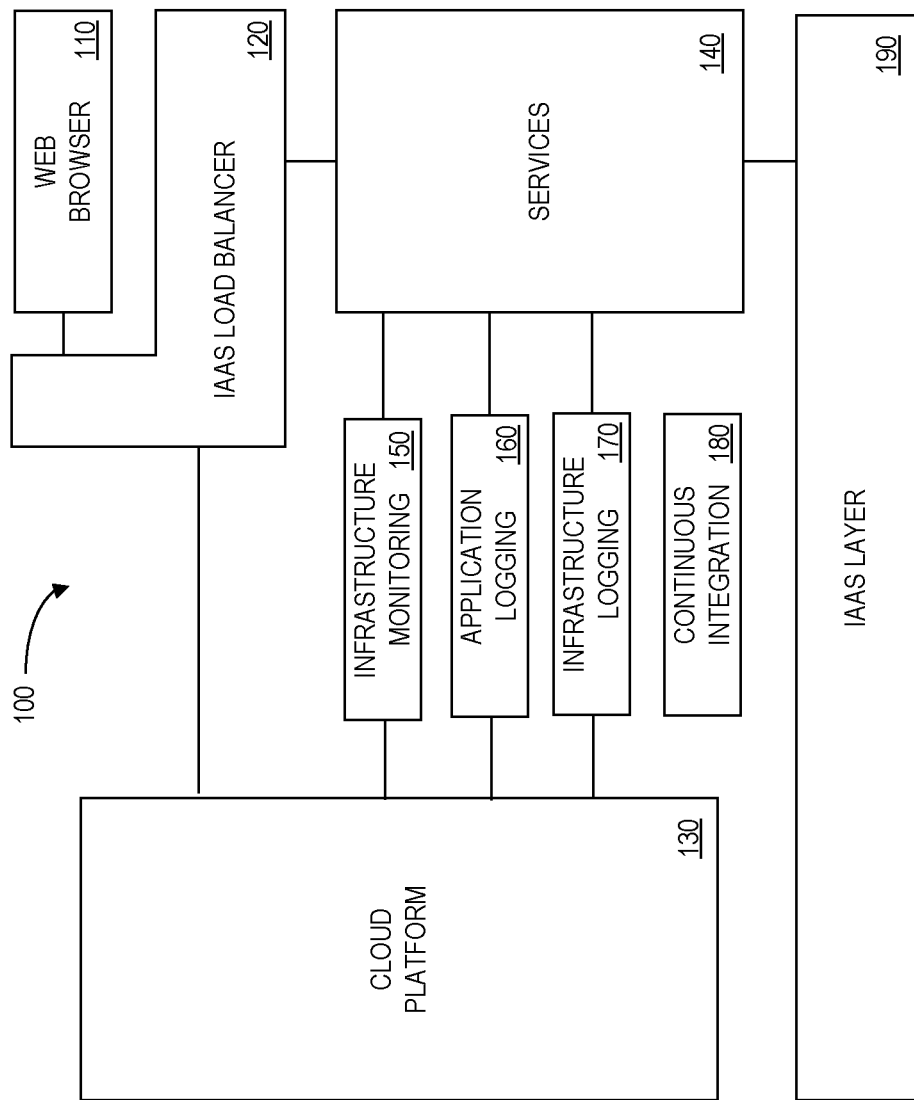
FIG. 1 is a high-level block diagram of cloud computing environment in accordance with some embodiments.

A cloud platform may comprise an open PaaS product that provides core services to build and extend cloud applications on multiple cloud Infrastructure-as-a-Service ("IaaS") providers, such as AMAZON® WEB SERVICES ("AWS"), OpenStack, AZURE® from MICROSOFT®, and the GOOGLE® CLOUD PLATFORM ("GCP"). FIG. 1 is a high-level block diagram of cloud computing environment 100 in accordance with some embodiments. In particular, a customer's web browser 110 may communicate with a cloud platform 130 (e.g., associated with a cloud controller and applications) via an IaaS internal load balancer 720 120. The cloud platform 130 may interact with services 140 (e.g., big data services) and services 140 may interact with infrastructure monitoring 150, application logging 160, infrastructure logging 170, etc. An IaaS layer 190 (e.g., associated with Virtual Machines ("VMs"), virtual disks, virtual networks, a Domain Name Server ("DNS"), a blob store, time servers, etc.) and continuous integration 180 may also be provided in connection with the cloud computing environment 100. Note that one of the services 140 that may be supported is a Relational Database Management System ("RDBMS") service, such as a Postgre Structured Query Language ("SQL") service.

PostgreSQL is a powerful, open source object-relational database system that uses and extends the SQL language combined with many features that safely store and scale complicated data workloads. PostgreSQL as a service may be provisioned on a cloud platform at a large scale, for example, thousands of PostgreSQL as a service instances might be provisioned and managed. PostgreSQL as a service instances and/or Virtual Machines ("VMs") may be created and provisioned by BOSH. BOSH is an open source project that offers a tool chain to release engineering, deployment, and life-cycle management tools for large scale distributed services. Note that VM custom modules may be deployed to provide various cloud qualities around the PostgreSQL. One quality and/or feature associated with VMs is having a single endpoint for high availability PostgreSQL as a service on a cloud platform such as AWS.

Figure 2:
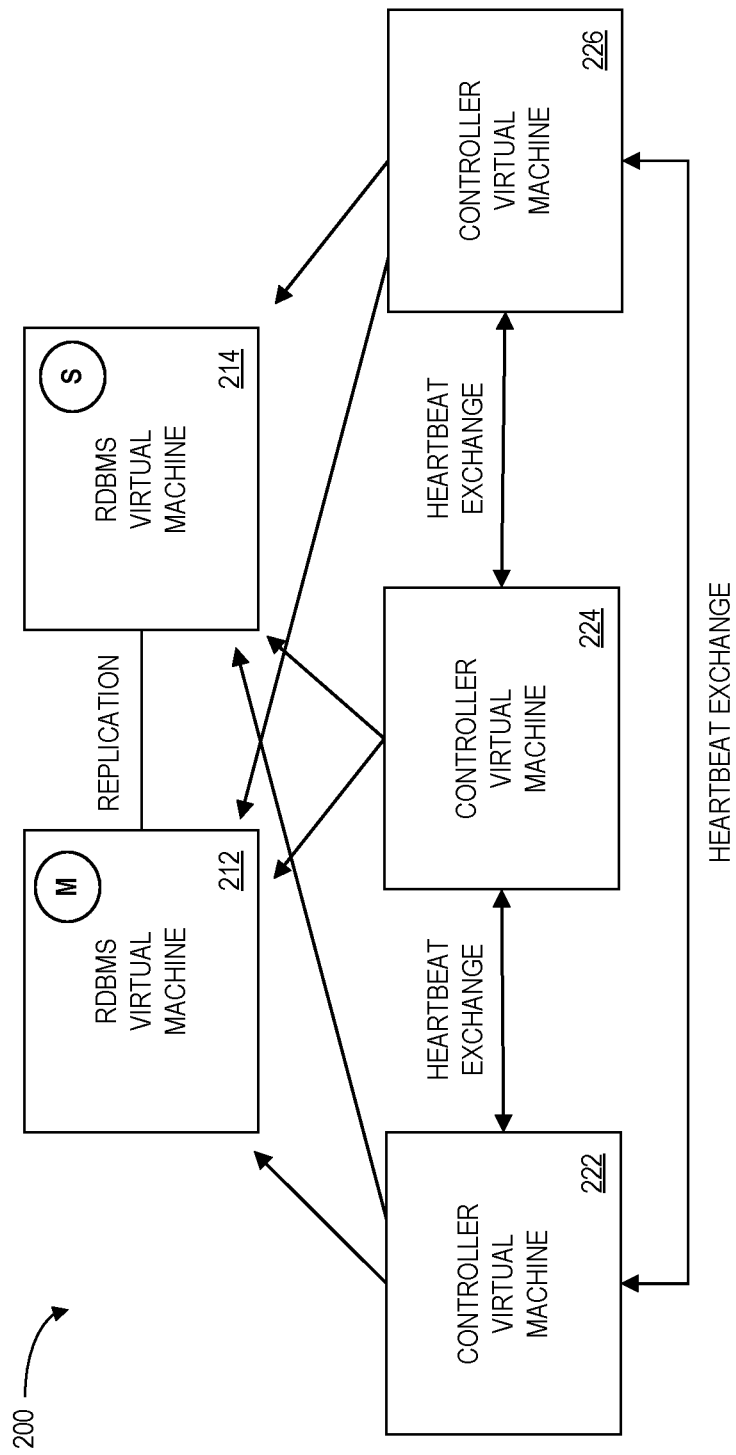
FIG. 2 is a high-level block diagram of an RDBMS-as-a-service in a cloud computing environment according to some embodiments.

In some embodiments, each PostgreSQL as a service instance or cluster may include five VMs (two PostgreSQL VMs and three PGPOOL or controller VMs. For example, FIG. 2 is a high-level block diagram of an RDBMS as a service (e.g., PostgreSQL as a service) system 200 in a cloud computing environment according to some embodiments. The system 200 includes a "master" (or primary) RDBMS VM 212 (illustrated with an "M" in FIG. 2) and a "standby" (or secondary) RDBMS virtual machine 214 (illustrated with a "S" in FIG. 2). In addition, the system 200 includes three controller VMs 222, 224, 226. Thus, each PostgreSQL as a service instance (or cluster) consists of five VMs: two RDBMS VMs 212, 214 (or PostgreSQL VMs) and three controller virtual machines 222, 224, 226 (or PGPOOL/controller VMs).

According to some embodiments, one PostgreSQL VM 212 runs in "master" mode and may be responsible for serving all the read and write requests made by applications connected to the cluster. A second PostgreSQL VM 214 runs in "standby" mode and replicates the data from the master 212 either in a synchronous or asynchronous way depending on the configuration. At any point in time, the PostgreSQL standby node 214 may act as the fallback/failover node in case of any failure in master node 212. In some embodiments, the PostgreSQL standby node 214 may also be responsible for serving read requests from the applications connected to the cluster (e.g., so that the request load on the master node 212 can be alleviated).

The three PGPOOL nodes 222, 224, 226 may comprises controller nodes responsible for managing master and slave nodes 212, 214 in the cluster. A system might make use of software like PGPOOL to achieve a subset of features or the system 200 could be based on custom modules. The controller VMs 222, 224, 226 might be responsible for some or all of the following:

- identify the master and slave node 212, 214 in the cluster at any point in time;
- identify any failures in the master node 212, achieve consensus among themselves and perform associated operations to failover to the standby node 214;
- optionally load balance the requests submitted to the cluster by the connected applications;
- identify any replication failures between the master and slave nodes 212, 214 in the cluster node;
- perform monitoring of PostgreSQL VMs 212, 214 in the cluster and send information to a centralized monitoring server; and/or identify, log, and upload necessary logs to the centralized server for better debugging capabilities.

In one embodiment, a separate set of three controller nodes 222, 224, 226 are associated with each cluster and is responsible for some or all of the above features. This is done to make sure that any controller node failure does not impact any other cluster. In another embodiment, a pool of controller nodes 222, 224, 226 are created upfront and a random set of three controller nodes are associated with each cluster. These sets of controller nodes might be shared among multiple clusters to reduce the operational costs of VMs.

A cloud platform might manage more than 10,000 PostgreSQL-as-a-Service instances across multiple IaaS entities. An important cloud quality is High Availability ("HA"). Any service with HA qualities may be strictly bound by Service Level Agreements ("SLAs") which can provide stringent guarantees to application users about a service's availability throughout a life span (e.g., PostgreSQL might need to be available 99.99% of the time, no matter what kind of hardware or software disruptions arise). It may therefore be important that any service disruption resulting from a failure in the system be reduced to a minimal time period.

Figure 3:
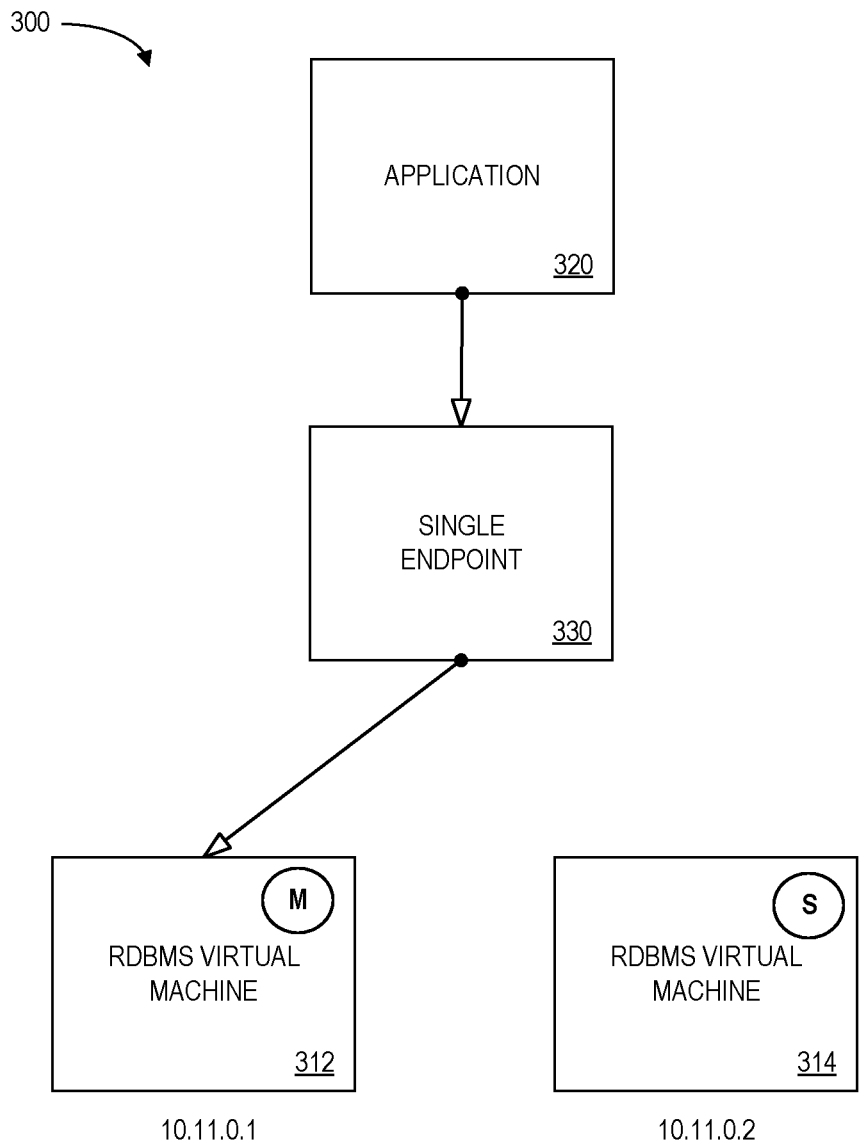
FIG. 3 illustrates an RDBMS-as-a-service with a single endpoint in accordance with some embodiments.

When an application needs to connect to a service, it must determine the information necessary to connect and communicate with the server. This information is known as a "service end-point." The service end-point for a PostgreSQL as a service may comprise: a protocol name, a private Internet Protocol ("IP") address or equivalent Fully Qualified Domain Name ("FQDN"), and a port in which the service has been made available. When a new service instance is created, a unique end-point may be assigned to it which is returned to applications that want to connect to that service. In the case of PostgreSQL as a service, more than one PostgreSQL VM is part of a service instance (cluster). At any point in time (since there is only one master node), the end-point generated should point to the "current" master (or primary) node in that cluster. FIG. 3 illustrates 300 an RDBMS-as-a-service cluster (e.g., having two RDBMS VMs 312, 314) accessed by an application 320 via a single endpoint 330 in accordance with some embodiments. Note that applications that use a service may execute various different types of runtimes and/or platforms. Moreover, drivers that connect to the service instance might not be able to handle multiple nodes as part of an end-point. In addition, an application might not be able to make a runtime determination about which cluster node is currently the master. Thus, it may be important that a FQDN provided as part of an end-point "always" points to the "current master" in the system. This also implies that during failover scenarios, the system should make sure that end-point is connected to the newly "promoted master" as quickly as possible so that the availability of the service is not impacted.

Figure 4:
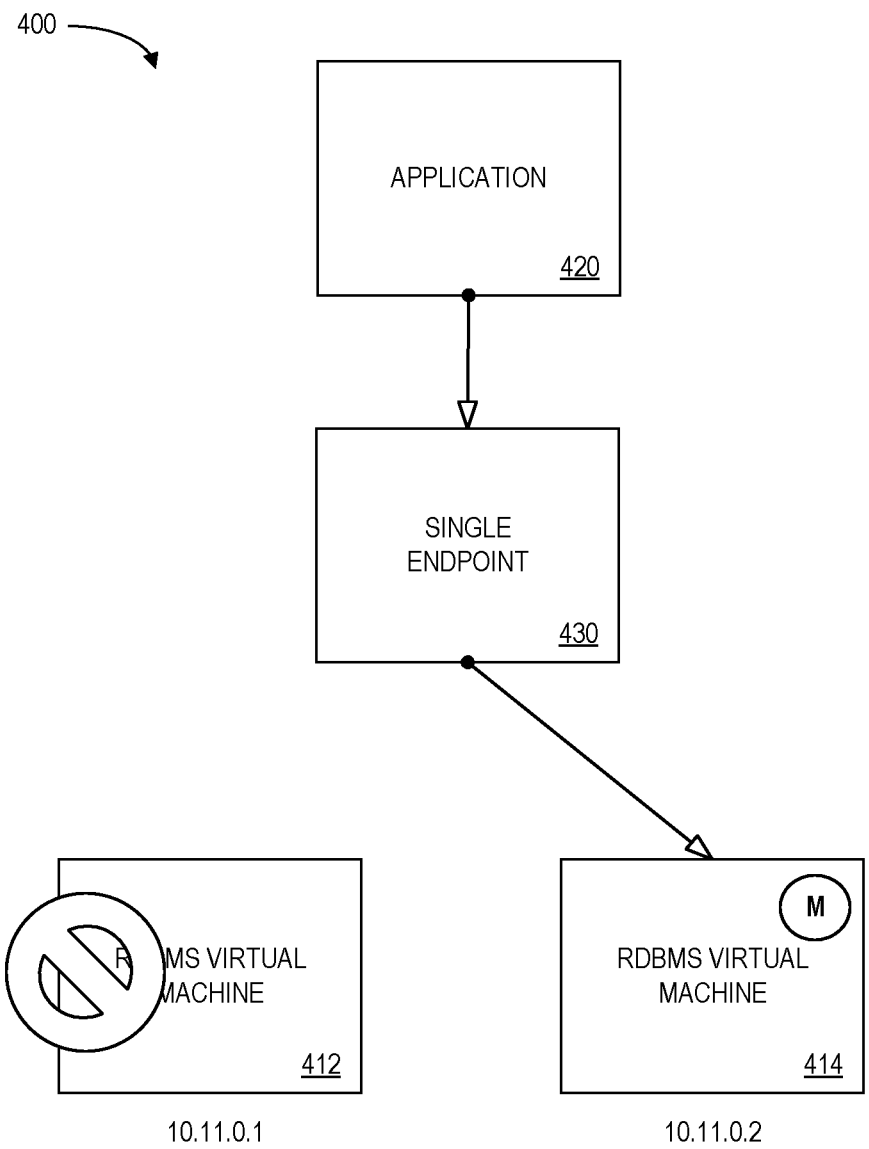
FIG. 4 illustrates an RDBMS-as-a-service with a single endpoint after a master node failure according to some embodiments.

FIG. 4 illustrates 400 an RDBMS-as-a-service with a single endpoint 430 after a master node 412 failure according to some embodiments. In this case, the other RDBMS VM 414 has been promoted to "master" (as illustrated by the "M" in FIG. 4), and the single endpoint 430 now automatically connects an application 420 to that VM 414. Note that a PostgreSQL as a service in a cloud platform might be offered for different IaaS providers (e.g., GCP, AZURE, AWS, and Openstack) and single endpoint solutions may be optimized to make use of the features of each IaaS provider. In a multi-cloud environment, since the architecture and associated virtualized resources are different for each hyperscale provider, a generic solution might not apply for all hyperscale environments. Thus, a single endpoint approach and technique may be developed and implemented for each hyperscale provider in a unique and efficient way.

One important quality of a cloud platform is high availability. In a single availability zone architecture, an entire zone may fail or go down. In that case, availability will also be down because the zone is not up and running. As a result, a multi-availability zone architecture may be important. For example, on AWS each Availability Zone ("AZ") runs on its own physically distinct, independent infrastructure, and is engineered to be highly reliable. According to some embodiments, each of the two PostgreSQL nodes in a cluster may be placed in a different availability zone. In the case of an AZ failure, the system can therefore have a standby node in another zone to handle failover for the cluster.

Some embodiments described herein utilize a Secondary Private Internet Protocol ("SPIP") address in a single AZ architecture. This approach might not be applicable in a multiple AZ architecture because SPIP can be floated from one node to another node only if both nodes are present in the same subnet as the SPIP. In other words, the SPIP and IP addresses of both PostgreSQL nodes should belong to same subnet. Also, in AWS a subnet cannot be spanned across AZs (that is, no two availability zones can share the subnets). As a result, SPIP cannot be applied in a multiple AZ architecture. Instead, some embodiments described herein provide a novel, dynamic, and distributed approach to provide a single endpoint for multiple AZ PostgreSQL as a service in a cloud platform (e.g., AWS).

Figure 5:
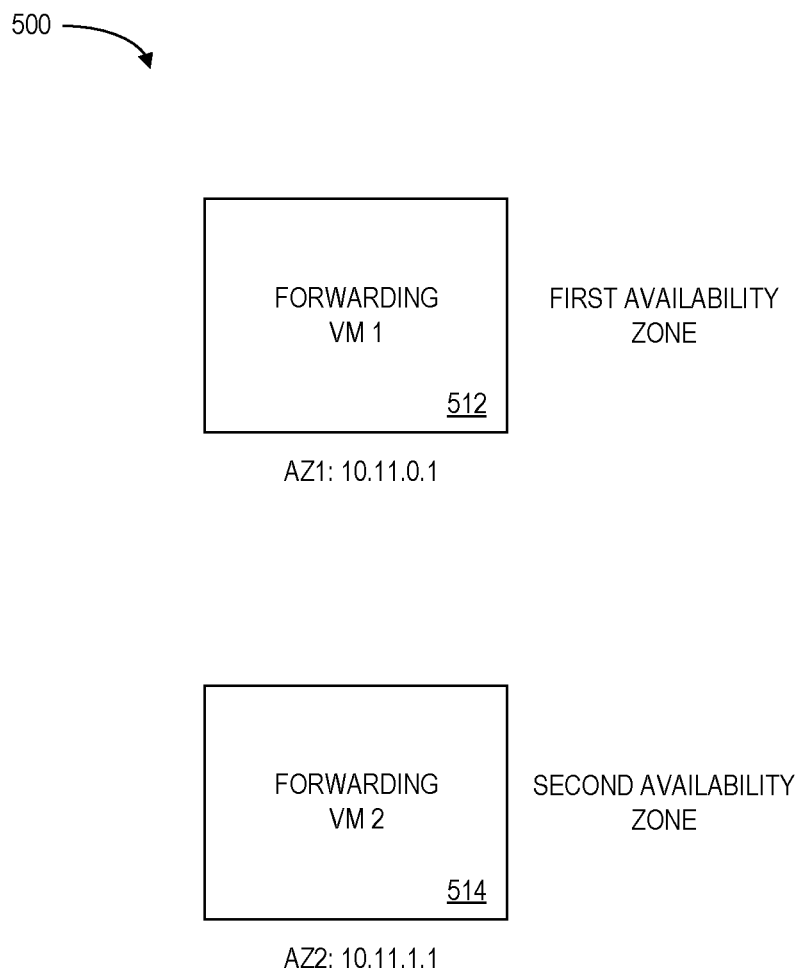
FIG. 5. illustrates a multiple availability zone architecture in accordance with some embodiments.

To provide a single endpoint solution for a RDBMS as a service in a cloud-based computing environment in a secure, automatic, and accurate manner, FIG. 5 is a high-level system 500 architecture in accordance with some embodiments. The system 500 includes two availability zones, and a VM 512, 514 has been spawned in each zone. In particular, forwarding VM 1 512 is in AZ1 with an address of "10.11.0.1" and forwarding VM 514 is in AZ2 with an address of "10.11.1.1." These may represent, for example, standard AMAZON® Elastic Compute Cloud EC2 instances of AWS as shown in FIG. 5. As used herein, devices, including those associated with the system 500 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The system 500 may store information into and/or retrieve information from various data stores, which may be locally stored or reside remote from the RDBMS as a service cluster. Although a single RDBMS as a service cluster is described in some embodiments herein, any number of such devices may be included. Moreover, various devices described herein might be combined according to embodiments of the present invention. The system 500 functions may be performed by a constellation of networked apparatuses, such as in a distributed processing or cloud-based architecture.

A user may access the system 500 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations or results from the system 500.

Figure 6:
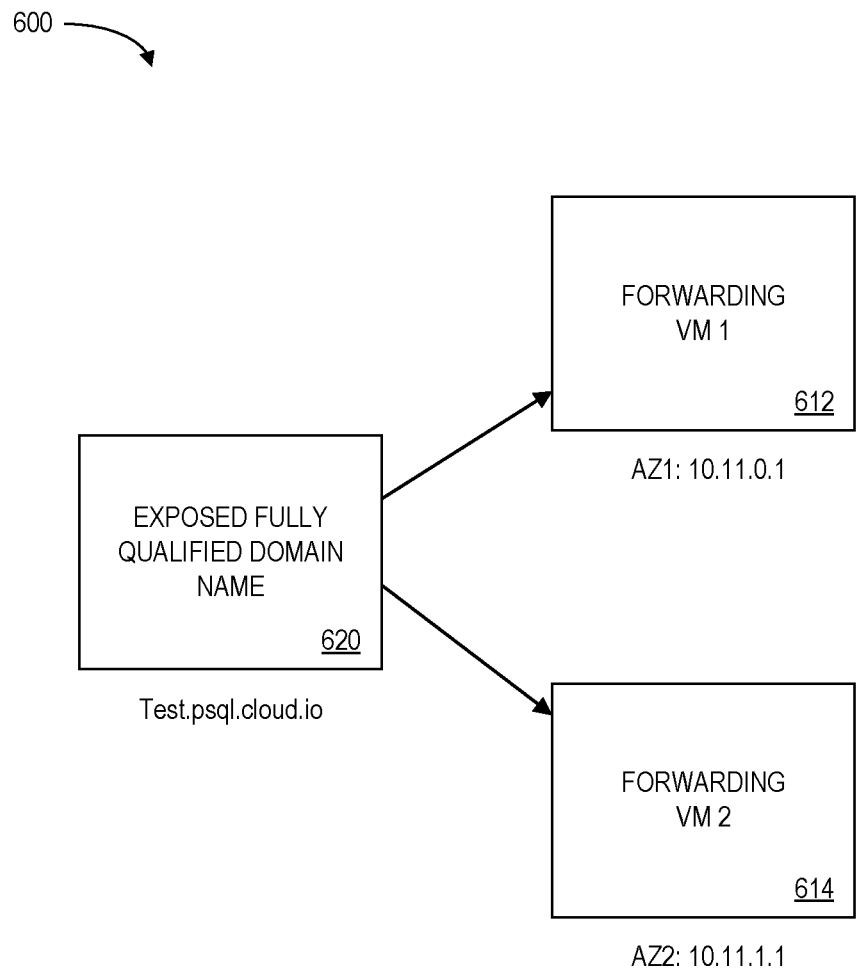
FIG. 6 illustrates utilization of a cloud DNS web service according to some embodiments.

An AWS Route 53 record set may be created and the two VM IP addresses may be registered with this record set. Note that Route 53 is a highly available and scalable cloud Domain Name System ("DNS") web service that gives developers a reliable and cost-effective way to route end users to Internet applications by translating a name such as "Test.psq1.cloud.io" into a numeric IP address. FIG. 6 illustrates a system wherein an exposed fully qualified domain name 620 is provided for the forwarding VMs 612, 614 (in different AZs. Each record set will expose a DNS that the client and/or customer can use to connect. In the example being described, the exposed by Route 53 record set is "Test.psq1.cloud.io."

Figure 7:
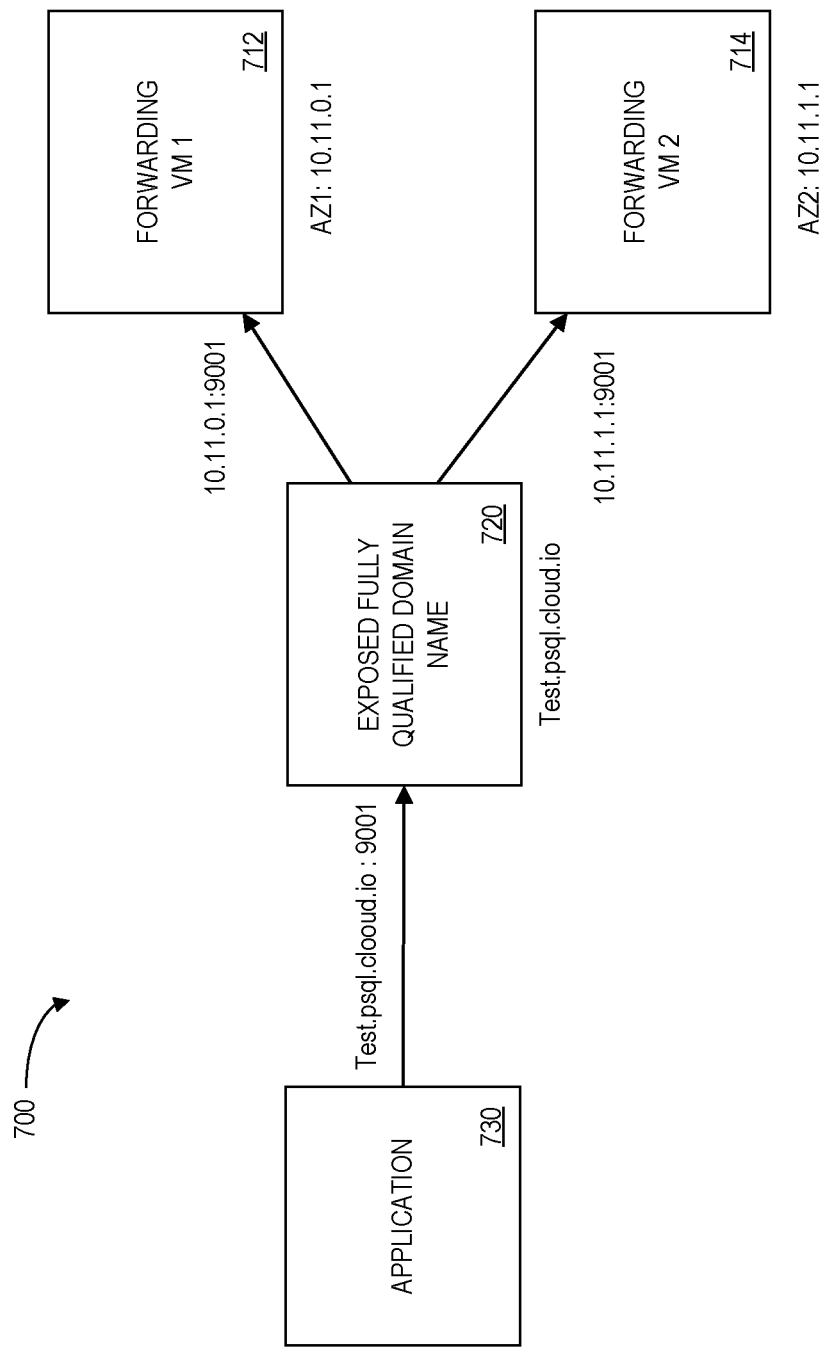
FIG. 7 illustrates application request routing in accordance with some embodiments.
Figure 8:
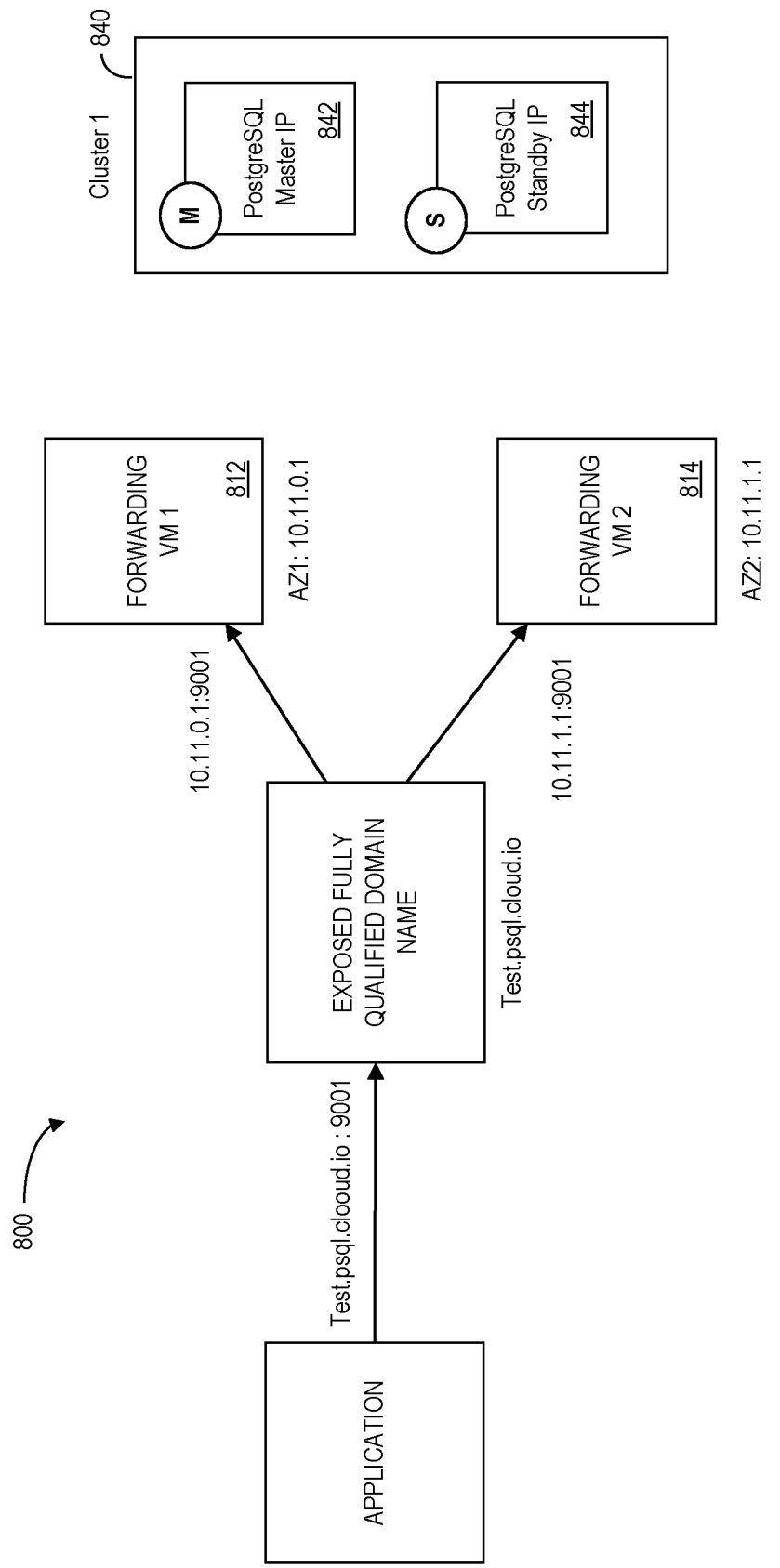
FIGS. 8 through 12 illustrate request routing for a PostgreSQL cluster according to some embodiments.

As shown in the system 700 of FIG. 7, if client and/or customer application 730 connects using this DNS 720 on any port, it will be forwarded on any one of the forwarding VMs 712, 714 on same port registered with the Route 53 record set. Now consider a PostgreSQL cluster which is spanned across multiple AZs (e.g., both PostgreSQL nodes are placed in different availability zones) as shown by the system 800 of FIG. 8. In particular, the system 800 includes cluster 1 840 having a master IP 842 and a standby IP 844 and forwarding VMs 812, 814.

Figure 9:
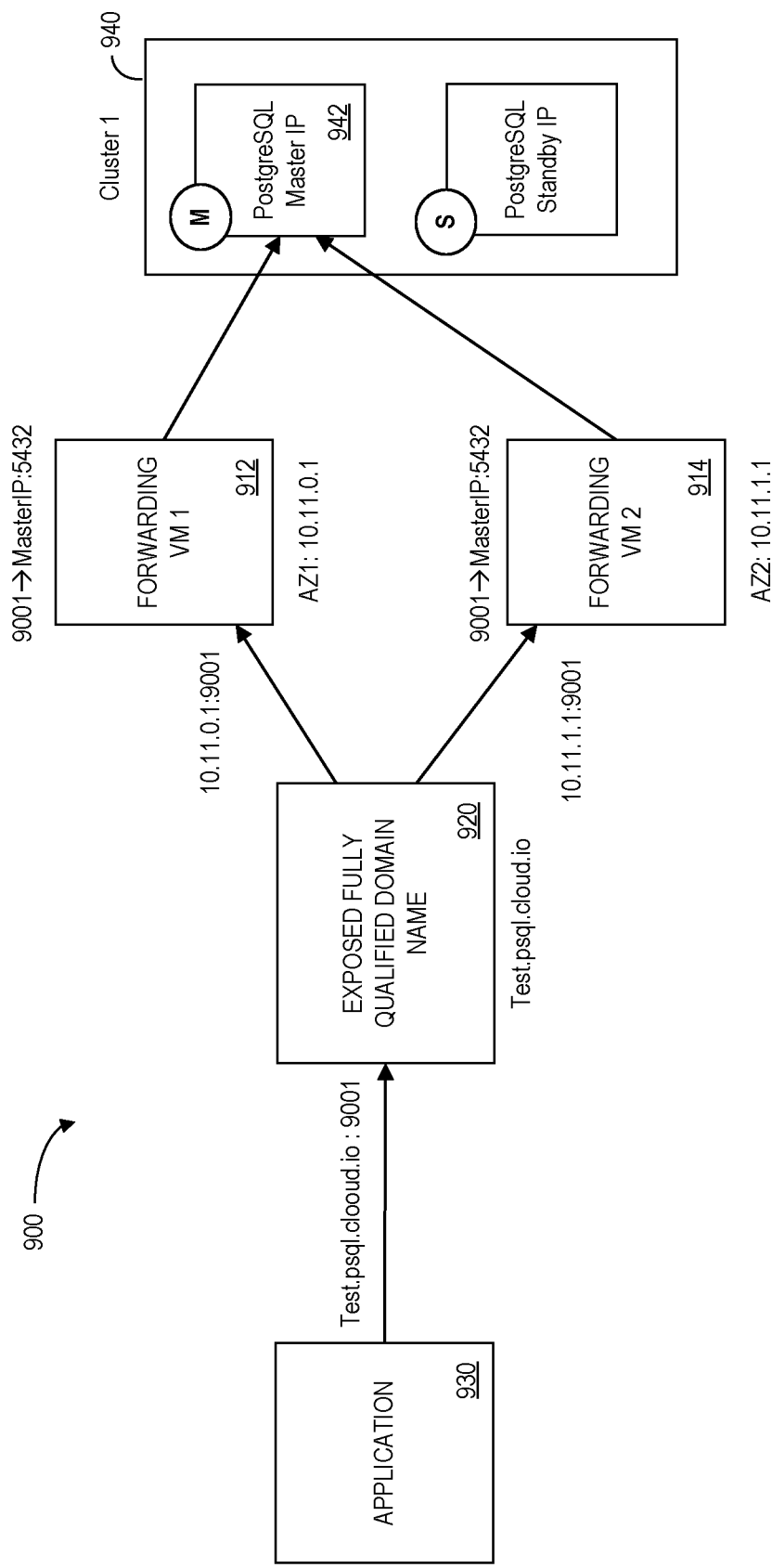

On forwarding, VMs 812, 814 IPtable rules (e.g., a Linux feature to block, allow, and/or forward network traffic packets) will be added such that any request coming on port "x" will be forwarded to port "5432" (the port where the PostgreSQL process runs) of the Master IP 842 (which is primary PostgreSQL node). In the system 900 of FIG. 9, "x" is 9001. Now, when an application 930 connects using the DNS 920 of the Route 53 record set on port "x," it will forward this request to any of the forwarding VM 912, 914 registered with the Route 53 record set on same port which is "x." Note that IPtable rules present on these forwarding VMs 912, 914 will forward this request to the PostgreSQL process port (default: 5432) in the primary node (Master IP 942) of cluster 1 940. As a result, the application 930 is always connected to the master IP 942. In this architecture, the Route 53 record set DNS acts as a single endpoint which clients use to connect to (and which always remains same).

Figure 10:
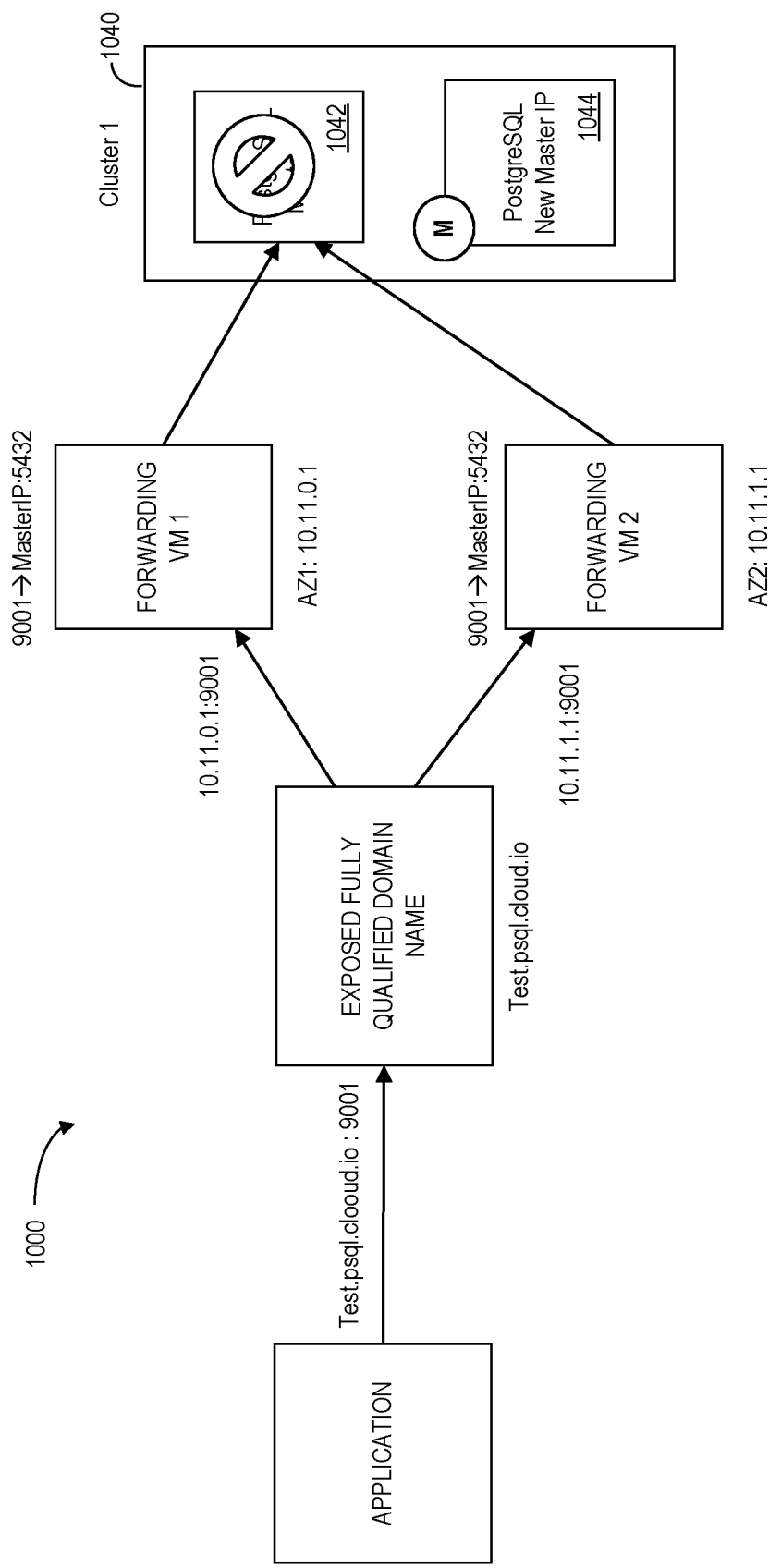
Figure 11:
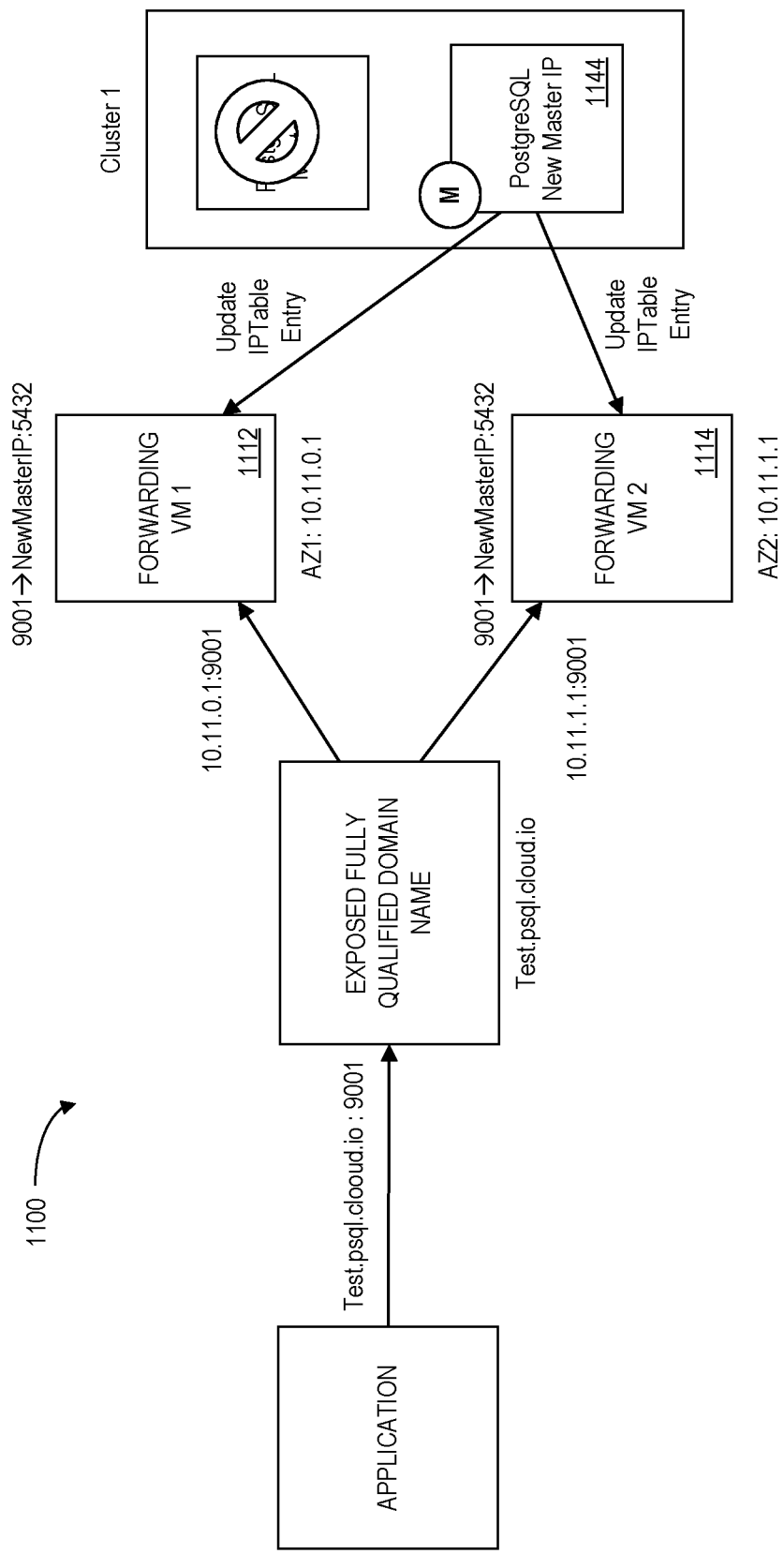
Figure 12:
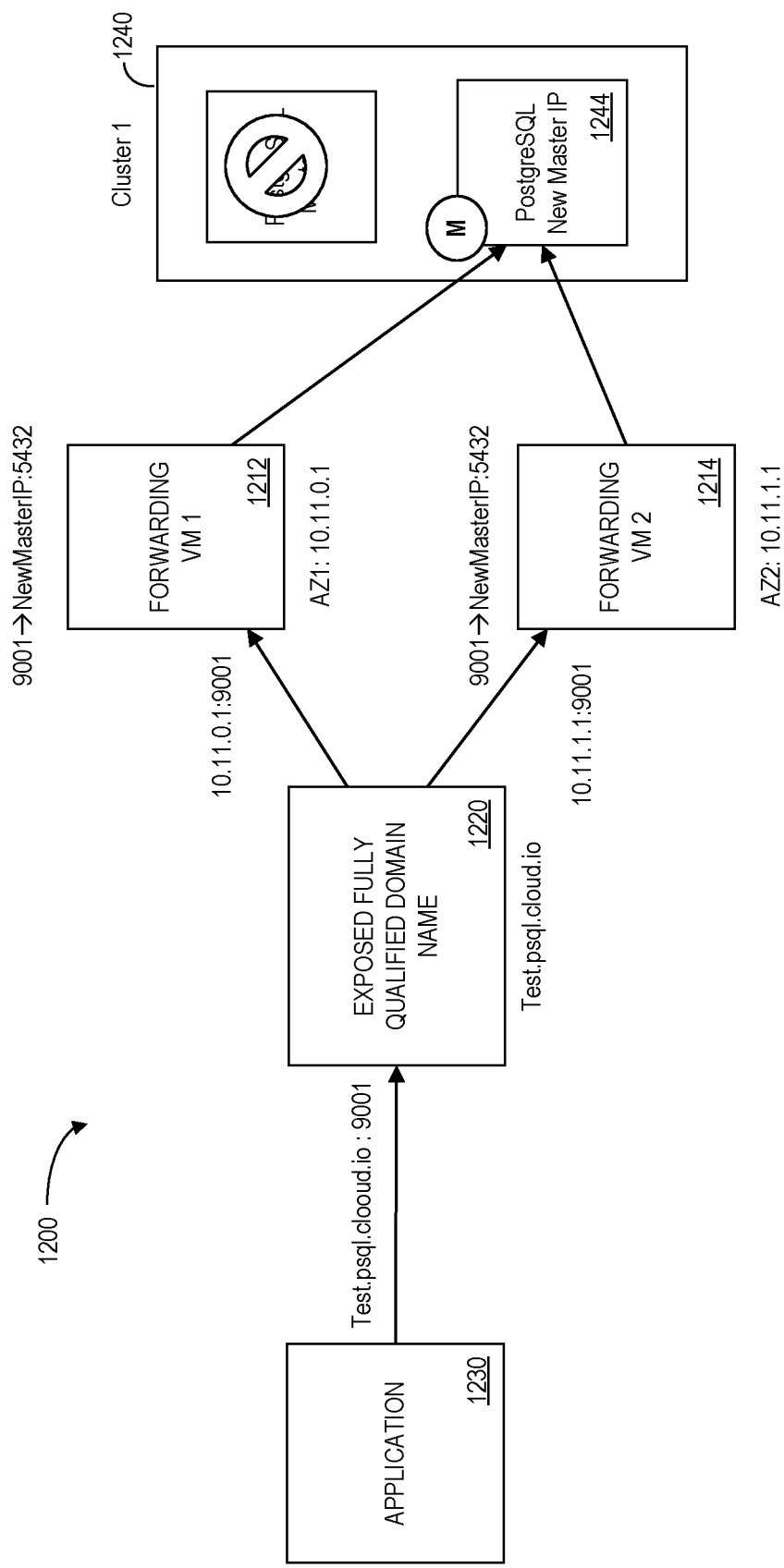
Figure 13:
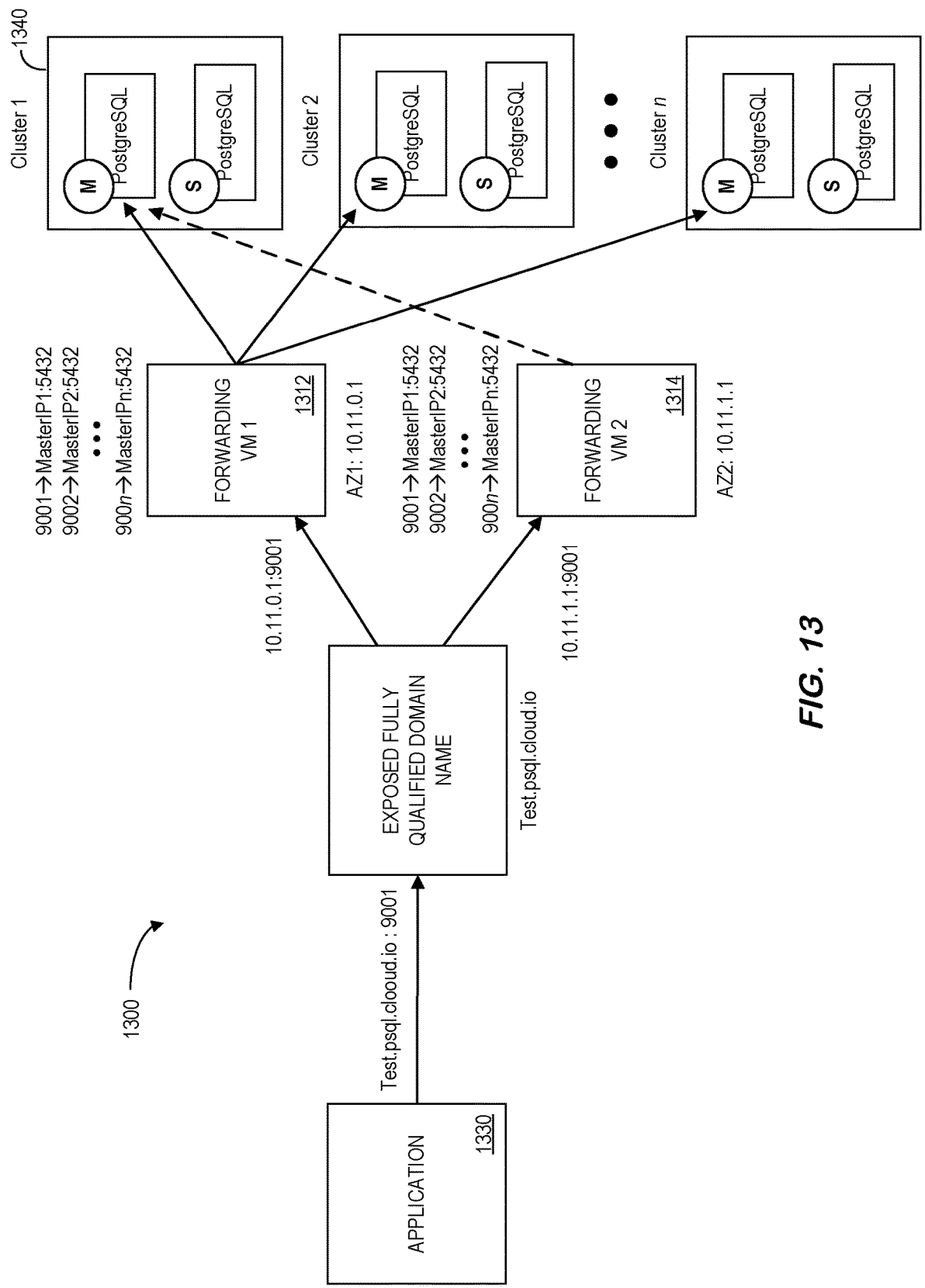
FIG. 13 illustrates multiple PostgreSQL clusters in accordance with some embodiments.

Now, consider a failover such as system 1000 of FIG. 10. Suppose the primary node 1042 of cluster 1 1040 fails or is deleted. Using PostgreSQL's native feature, the system 1000 will promote the standby node 1044 to be the new primary node. Since the primary node is changed, the system 1100 of FIG. 11 lets the forwarding VMs 1112, 1114 be informed about this by changing IPtable rules to point to the new primary node 1144 as illustrated by the system 1100 of FIG. 11. Now, all the application 1230 requests with the Route 53 record set DNS 1220 will be forwarded to new primary node 1244 of cluster 1 1240 from the forwarding VMs 1212, 1214 using updated IPtable rules illustrated by the system 1200 of FIG. 12. By handling failover in this way, the amount of downtime might be as low as two or three seconds because only the IPtable rules are changed on the forwarding VMs 1212, 1214. Considering the cost of addition VMs, the forwarding VMs 1212, 1214 can be shared across n multiple service clusters 1340 as illustrated by the system 1300 of FIG. 13. In the system 1300, note that multiple IPtable rules are present on the forwarding VMs 1312, 1314. Each rule uniquely forwards the traffic from an application 1330 based on the destination port on which client and/or customer is requesting. For example, a request on port 9001 will be forwarded to the cluster 1 master PostgreSQL node, a request on 9002 will be forwarded to cluster 2 master PostgreSQL node, etc.

Figure 14:
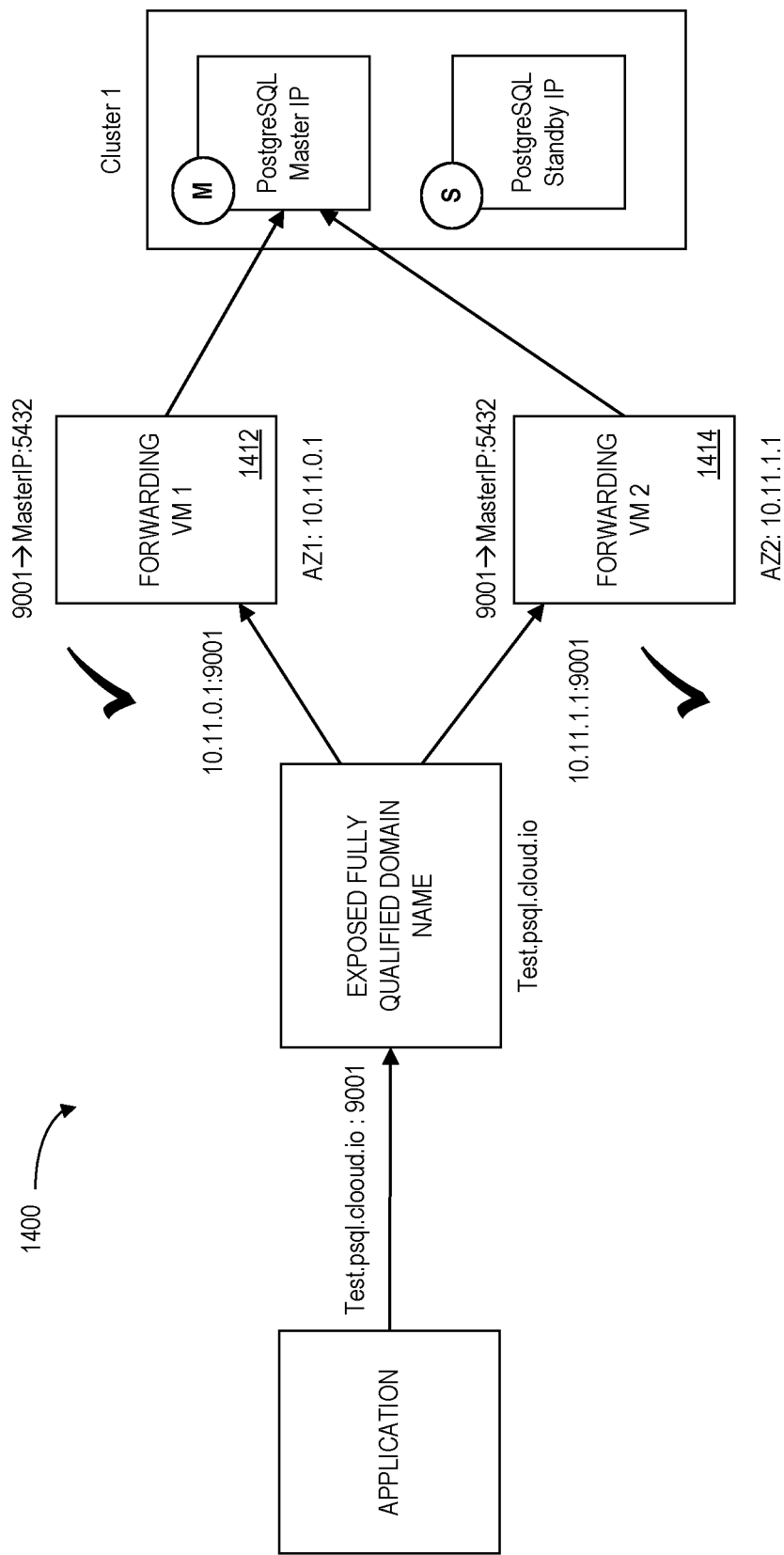
FIGS. 14 through 17 illustrate the use of VM health checks according to some embodiments.
Figure 15:
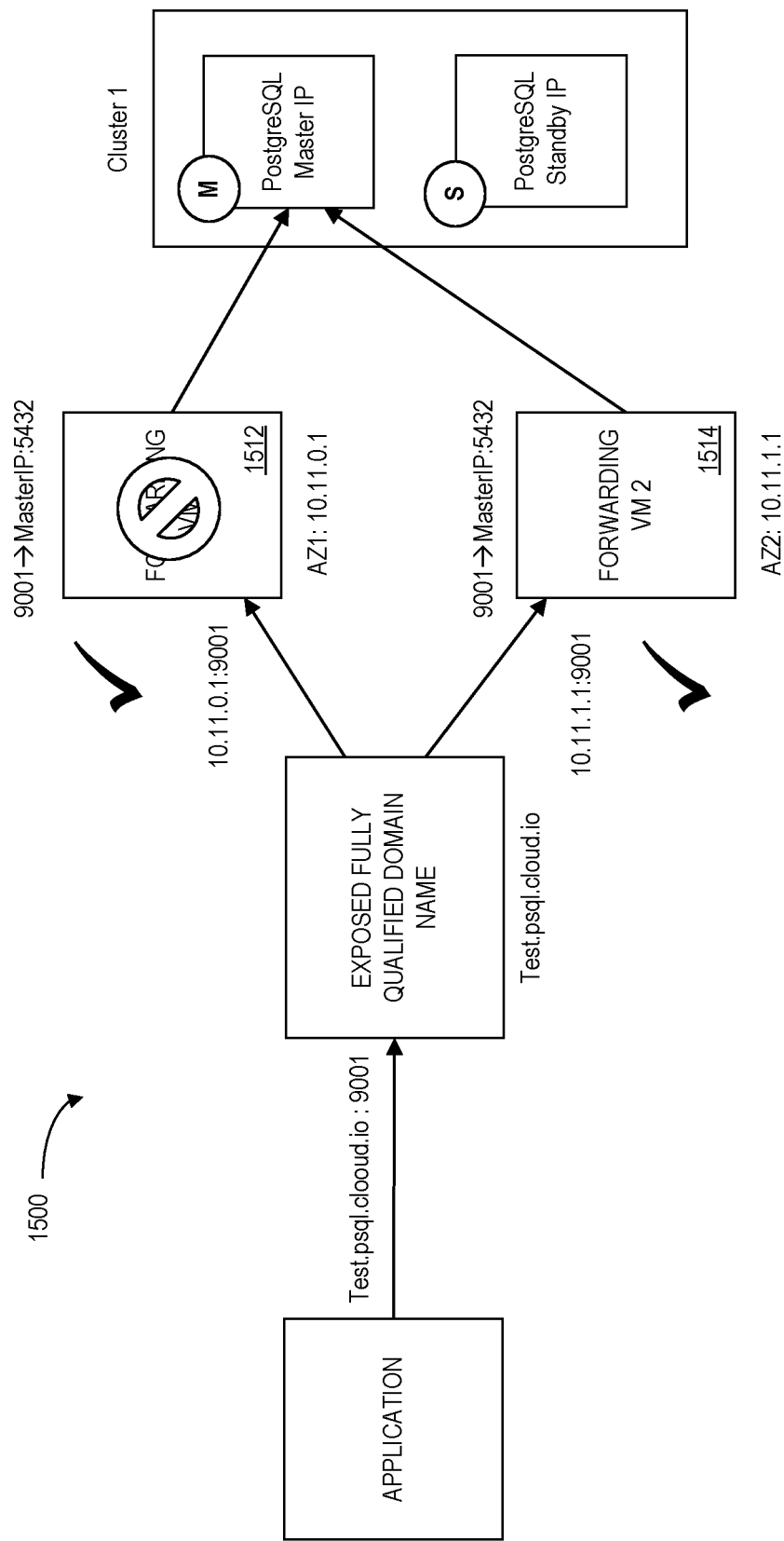
Figure 16:
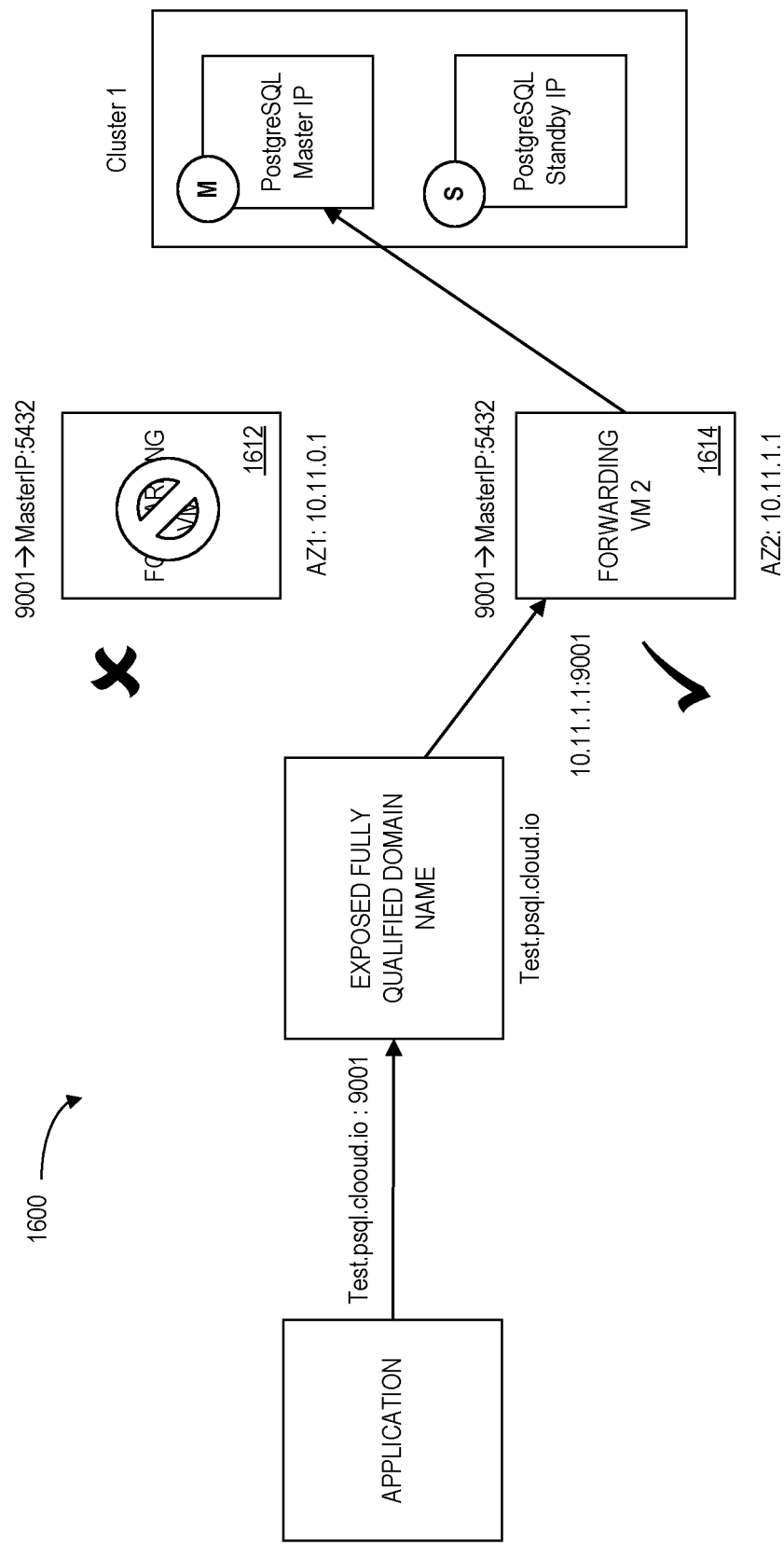
Figure 17:
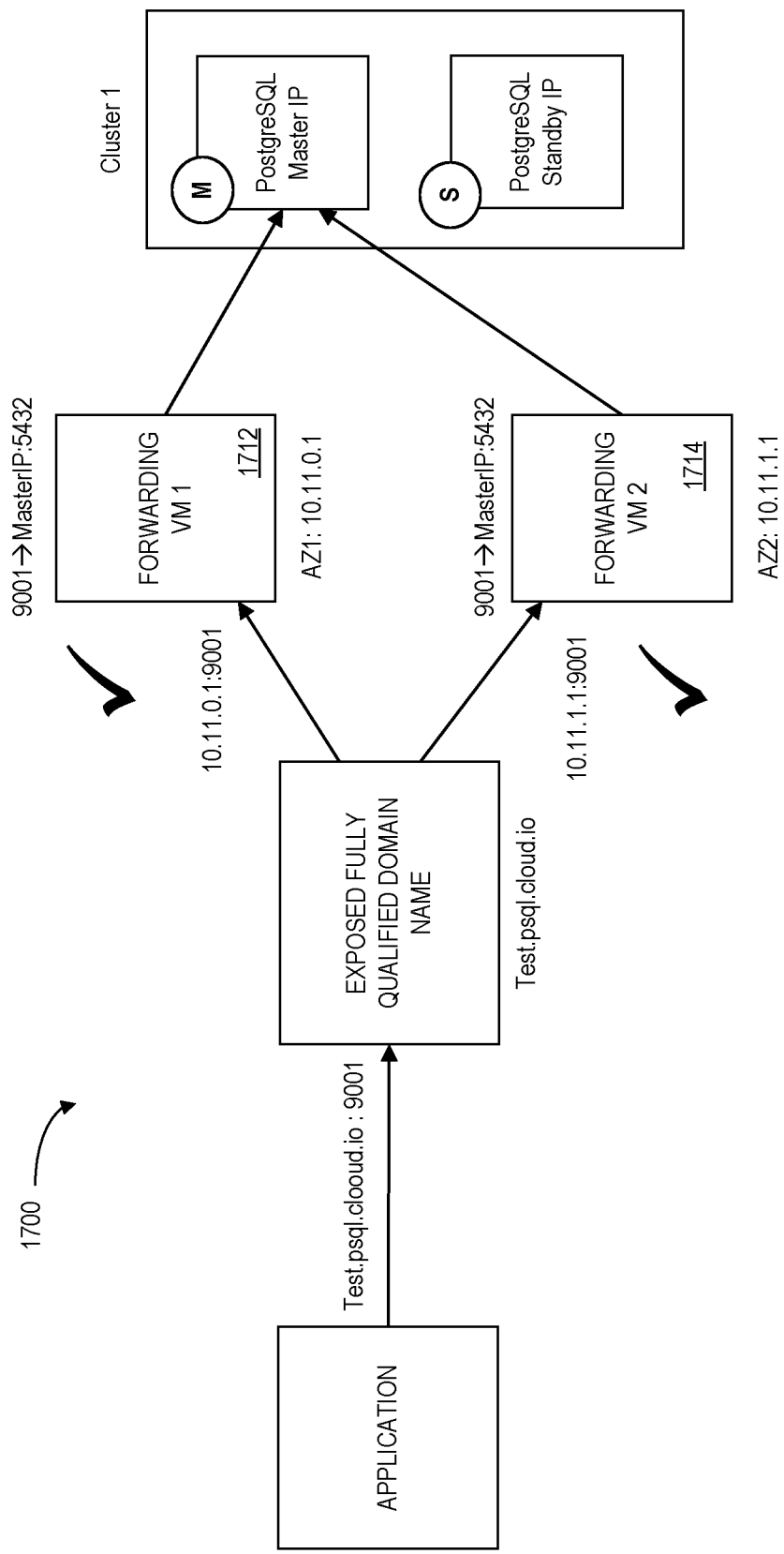

Moreover, this solution may be extended for any number of zones. For example, corresponding forwarding VMs may be added in each zone. Consider, however, the situation when one of the forwarding VMs goes down (e.g., fails or is deleted) and Route 53 forwards the request to that specific forwarding VM. This is a valid failing scenario, because if the forwarding VM goes down then there is no VM where the request can be sent. Note that Route 53 has a feature to set a health check on its registered VMs. So, while registering forwarding VMs with Route 53, Route 53 health checks may be set with forwarding VMs. According to some embodiments, the health check is set on a standard port (e.g., port 22) which will indicate whether the VM is up or down. The system 1400 of FIG. 14 illustrates such a setup, where the "check mark" in the FIG. indicates that the associated VM 1412, 1414 is up and running. As depicted in FIG. 14 both the VMs are up and running. In this case both health checks will pass. Now consider the system 1500 of FIG. 15 where one of the forwarding VMs 1512, 1514 goes down (e.g., fails or is deleted). As shown in the system 1600 of FIG. 16, the health check set on failed/deleted forwarding VM 1612 will fail (illustrated by an "x") and Route 53 will stop sending requests to that forwarding VM 1612 (while the other VM 1614 continues to function as normal). When, as illustrated by the system 1700 of FIG. 17, the forwarding VM 1712 comes back again, all the IPtable rules will be copied from other forwarding VM 1714 and Route 53 health check will be healthy again.

Figure 18:
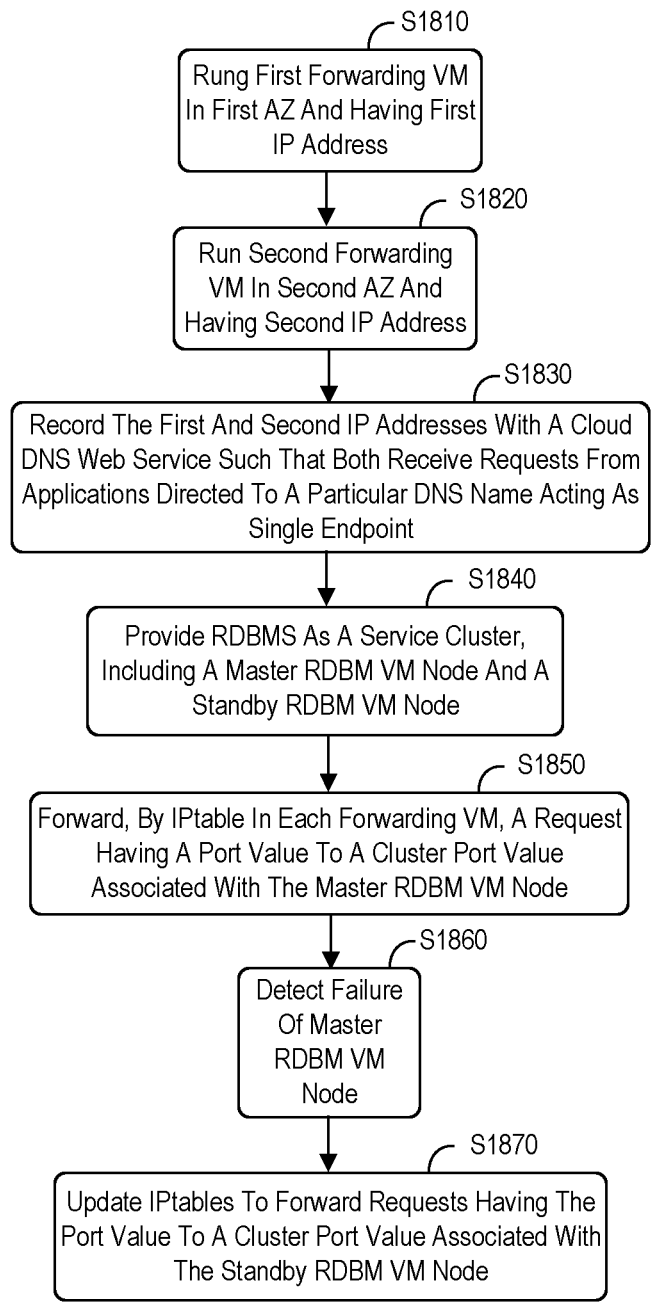
FIG. 18 is an example of a multiple availability zone single endpoint method in accordance with some embodiments.

FIG. 18 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S1810, the system may execute a first forwarding VM in a first availability zone and having a first Internet Protocol IP address. At S1820, the system may execute a second forwarding VM in a second availability zone and having a second IP address. At S1830, the system may record the first and second IP addresses with a cloud DNS web service of a cloud provider such that both receive requests from applications directed to a particular DNS name acting as a single endpoint. At S1840, the system may provide a RDBMS as a service cluster, including a master RDBMS VM node and a standby RDBMS VM node. At S1850, the system may forward, by an IPtable in each forwarding VM, a request having a port value to a cluster port value associated with the master RDBMS VM node. At S1860, the system may detect a failure of the master RDBMS VM node. Responsive to this detection, the system may update the IPtables to forward requests having the port value to a cluster port value associated with the standby RDBMS VM node at S1870.

Thus, embodiments described herein may provide advantages such as being easily scaled for many PostgreSQL clusters. Moreover, failover downtime may be relatively small (e.g., 2 or 3 seconds) which may be almost negligible. Some embodiments may be easy extended for any number of availability zones and cover all sorts of failure cases. In addition, embodiments may be applied on any type of service, application, or cluster. Examples have been provided from a PostgreSQL point of view, but might be extended to any other type of service.

Figure 19:
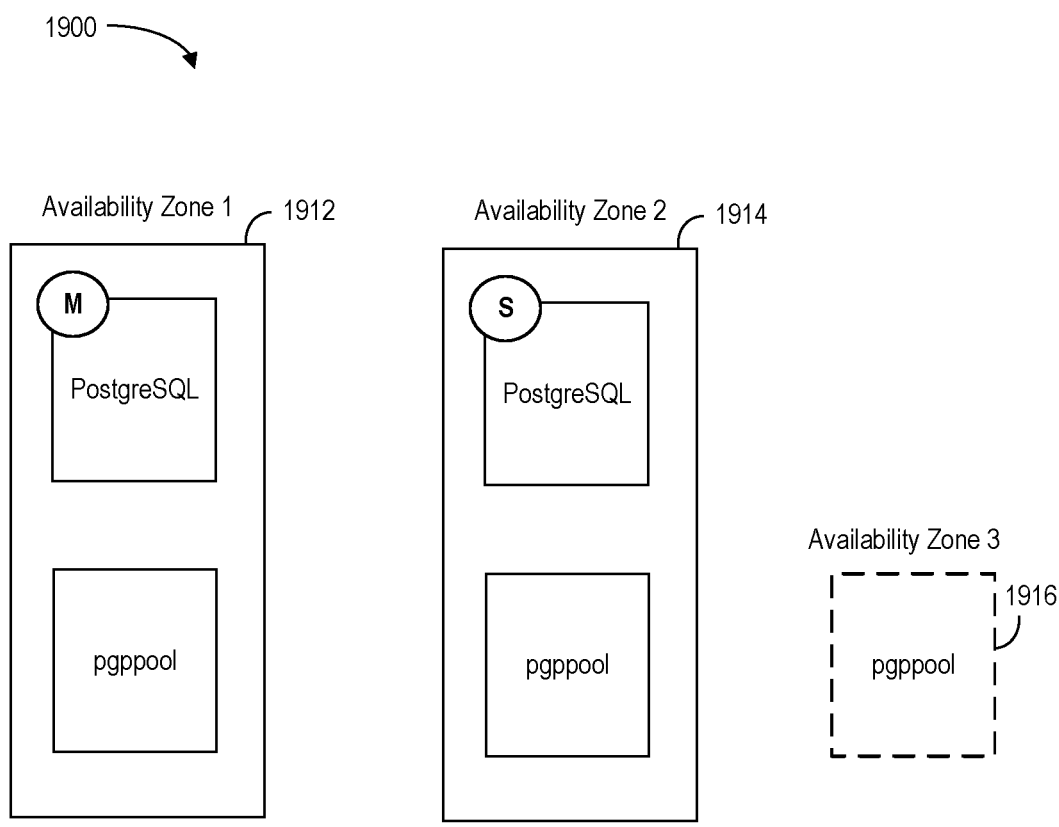
FIG. 19 is a PostgreSQL system with a multiple AZ architecture according to some embodiments.

Some embodiments described herein may provide a novel method for a single endpoint (e.g., in AWS) in a multiple AZ environment. For example, a FQDN may be used as a single endpoint and be part of the service endpoint information used to connect and communicate with a PostgreSQL server. Thus, the FQDN may resolve to the "current" master in a Highly Available ("HA") manner at any point in time. In a multiple AZ architecture, each PostgreSQL node may be placed in a different AZ. Also, the controller nodes may be placed in different AZs (e.g., three different AZs). With such an architecture for a particular cluster, one PostgreSQL node and one PGPOOL/controller node may be placed in a single availability zone as illustrated by the system 1900 of FIG. 19. In particular, a first RDBMS VM node and a first controller 1912 (PostgreSQL master node and PGPOOL nodes) executes in AZ 1, a second RDBMS VM node and a second controller node 1914 (PostgreSQL standby node and PGPOOL node) executes in AZ 2, and a third controller node 1916 executes in AZ 3.

Figure 20:
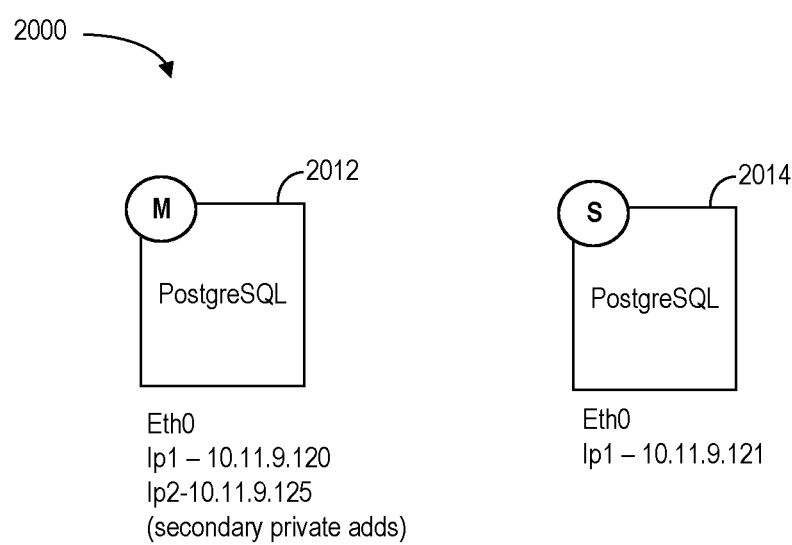
FIGS. 20 and 21 illustrates SPIP addresses in accordance with some embodiments.

On both PostgreSQL nodes 2012, 2014 a Secondary Private IP ("SPIP") address will be added as illustrated by the system 2000 of FIG. 20. Note that on every VM there is a default IP address present which is assigned when the VM is created. This IP address may be assigned on a primary interface (e.g., eth0). Apart from this IP address, a second IP address can be added on eth0 as a SPIP address. The primary IP address can't be removed or changed once allocated, but the SPIP can be removed or allocated to another resource. The SPIP may be added at the AWS infrastructure level. As a result, other resources of the AWS are aware of this resource address. In the example of FIG. 20, the default (unchangeable) IP address of the master PostgreSQL 2012 is "10.11.9.120" (Ip1) and the default IP address of the standby PostgreSQL 2014 is "10.11.9.121" (Ip1). The master PostgreSQL 2012 additionally has a SPIP address of "10.11.9.125" (Ip2). This IP address should also be associated within the VM, so that the Operating System ("OS") running on the VM is also aware of the IP address. If it is not associated, the OS will simply reject the network packets destined to that IP address.

To add/associate the IP address, the system may use:
ip addr add<IP address>dev eth0.

This command tells OS to add IP address on interface eth0. Note that an SPIP address can be floated to another VM within the same AZ. Thus, if two PostgreSQL nodes are in a single AZ, Ip2 can float between those two nodes. Note that the system 2000 of FIG. 20 may illustrate two availability zones (one to execute the master PostgreSQL 2012 and one to execute the standby PostgreSQL 2014). In practice, another controller node may execute in a third availability zone to help form a consensus when detecting a failure. This applies similarly to FIGS. 21 through 28.

Figure 21:
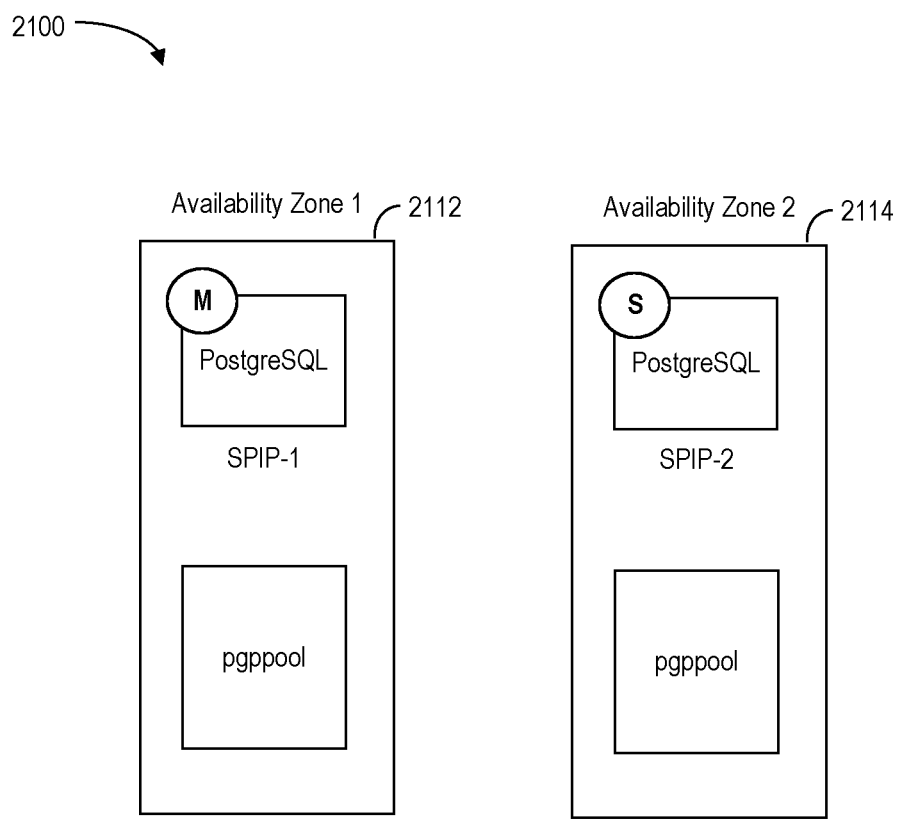
Figure 22:
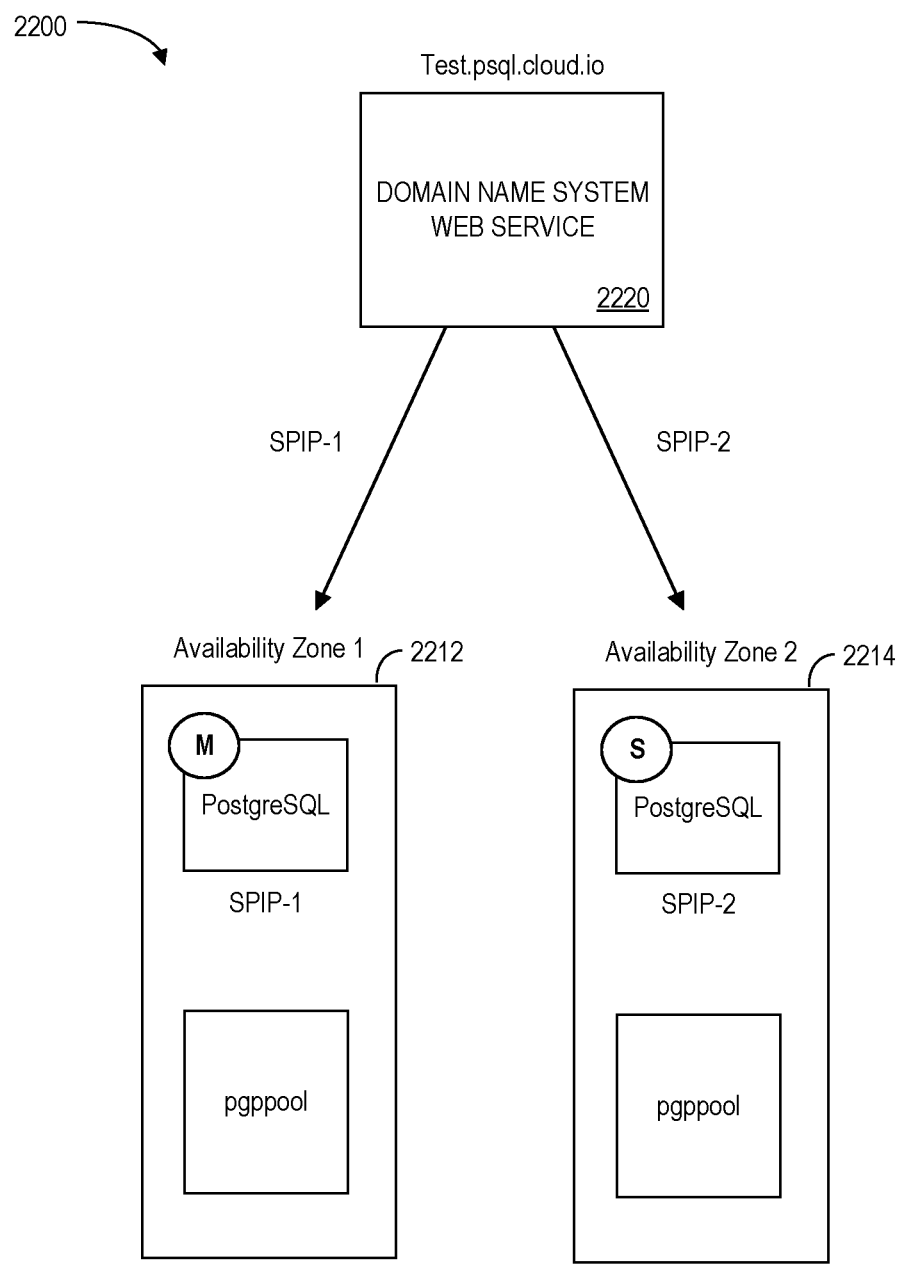
FIGS. 22 through 26 illustrate the use of a Fully Qualified Domain Name ("FQDN") in a single endpoint solution according to some embodiments.
Figure 23:
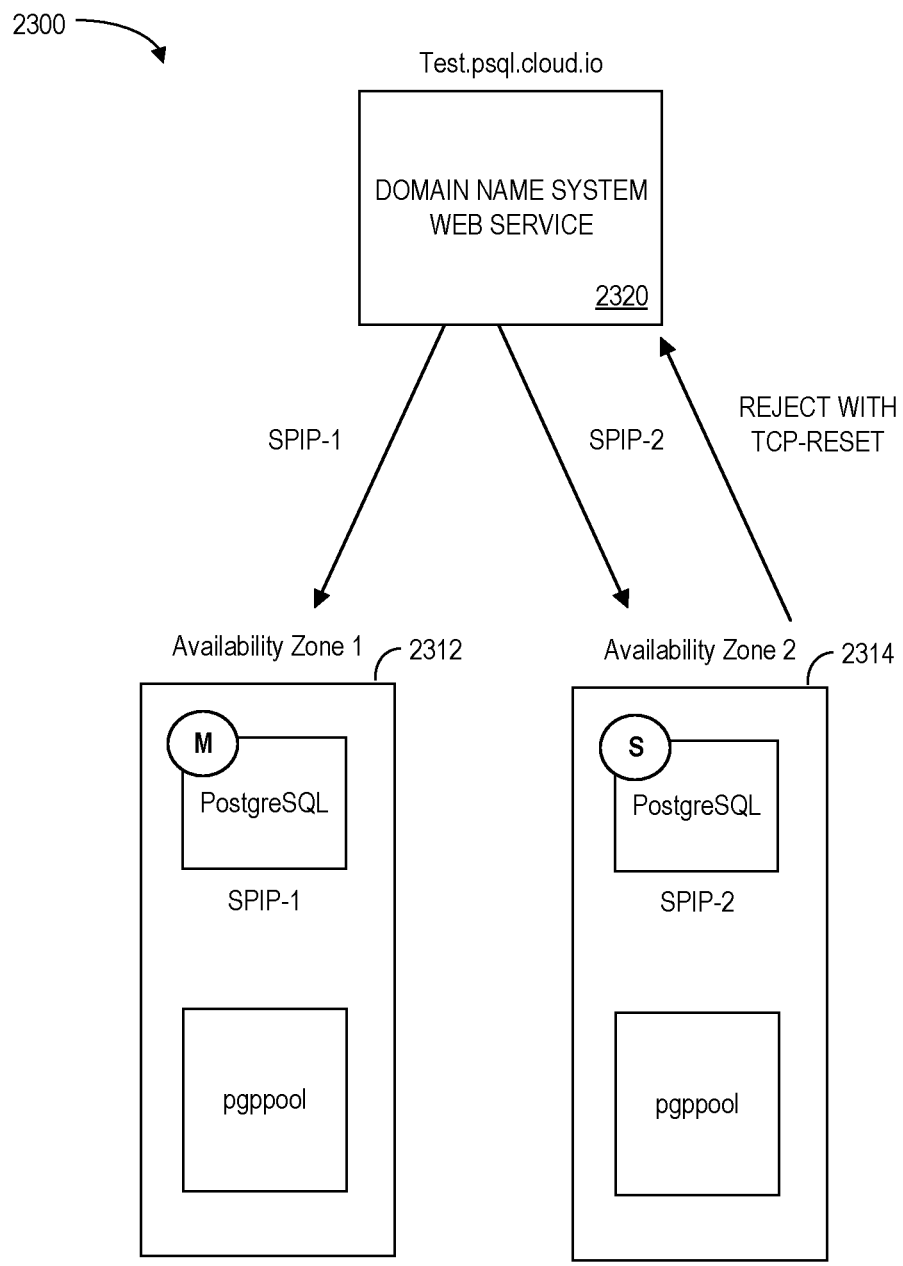

As illustrated by the system 2100 of FIG. 21, as an initial setup an SPIP may be added on both the PostgreSQL nodes (SPIP-1 and SPIP-2) 2112 AZ 1 and 2114 AZ2. In addition, an AWS Route 53 record set may be created and the two SPIPs may be registered with this record set as illustrated by the system 2200 of FIG. 22 in which a DNS web service 2220 routes requests to clusters 2212, 2214 in different AZs. If a client or customer connects to the Route 53 record set (e.g., via the "Test.psq1.cloud.io" address), the request will be forwarded to any of the registered SPIP. In other words, the request will be forwarded to any of the PostgreSQL nodes. This Route 53 record set (e.g., Test.psq1.cloud.io.) may act as a single endpoint which is given to customers and/or clients and which remains fixed throughout the lifecycle of a service instance. If there are multiple nodes or IPs registered with the Route 53 record set, then the request is sent to the first available node (it attempts all the nodes one-by-one until a connectable node is found).

When a client or customer is trying to connect to the Route 53 record set on port "x," it will forward the request to any of the registered nodes on same port "x." If there is no process running on port "x" on then requested node, then the OS running on that node will reject the request with a "TCP-reset" packet. If the Route 53 record set receives A "TCP-reset" packet as a response from a requested node, then it will try another node registered with the Route 53 record set. According to some embodiments, this property may be used to solve a single endpoint problem in an AWS multiple AZ architecture. On the standby PostgreSQL node, an IPtable rule is added to reject any packet that arrives with a destination of the SPIP assigned to the standby PostgreSQL node and a port of the PostgreSQL process (e.g., port 5432) with a "TCP-reset" packet as illustrated by the system 2300 of FIG. 23. As a result, when a Route 53 record set 2320 tries to connect with the Standby SPIP 2314 in AZ 2, it will be rejected by that node. Subsequently, the Route 53 record set 2320 will connect with the PostgreSQL node (the master node) in the 2312 AZ 1. As a result, when a client or customer connects using the Route 53 record set (e.g., "Test.psq.cloud.io") it will be always connected with the master PostgreSQL node.

Note that on both of the PostgreSQL nodes there is process with port 5432 running. To reject the packet, an IPtable rule needs to be added on the standby node. If there is no process with a given port is running on the node. then the OS will itself reject the packet.

Figure 24:
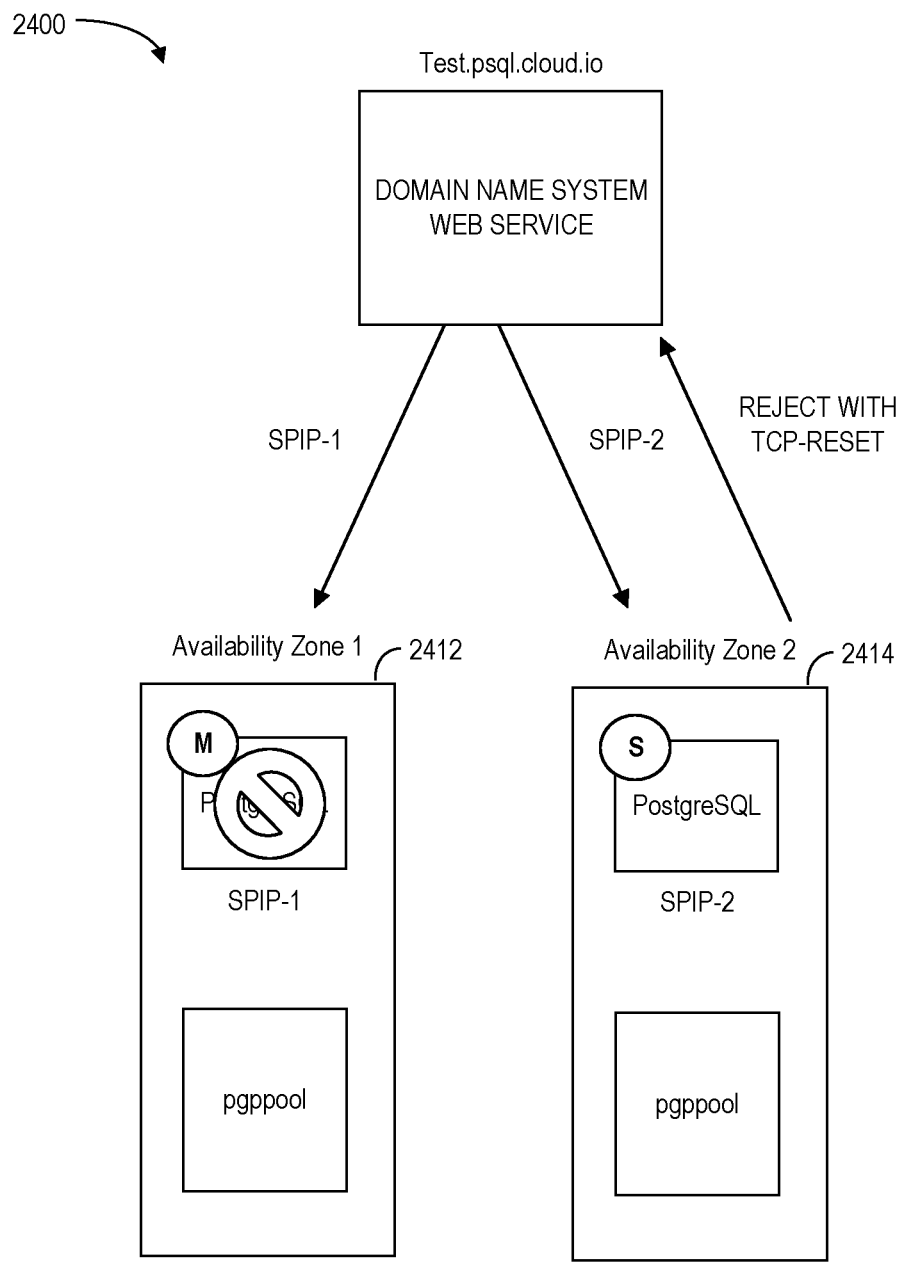
Figure 25:
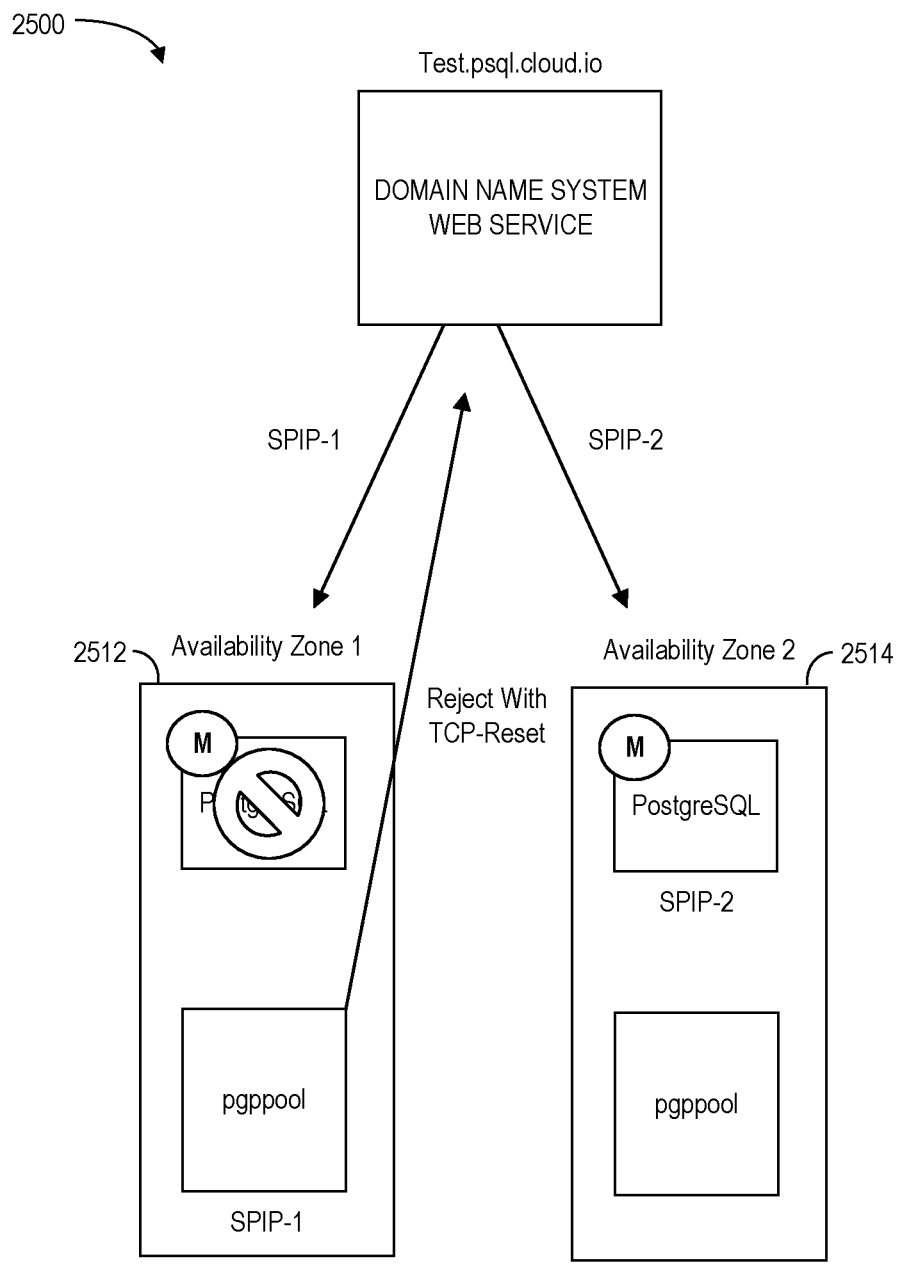
Figure 26:
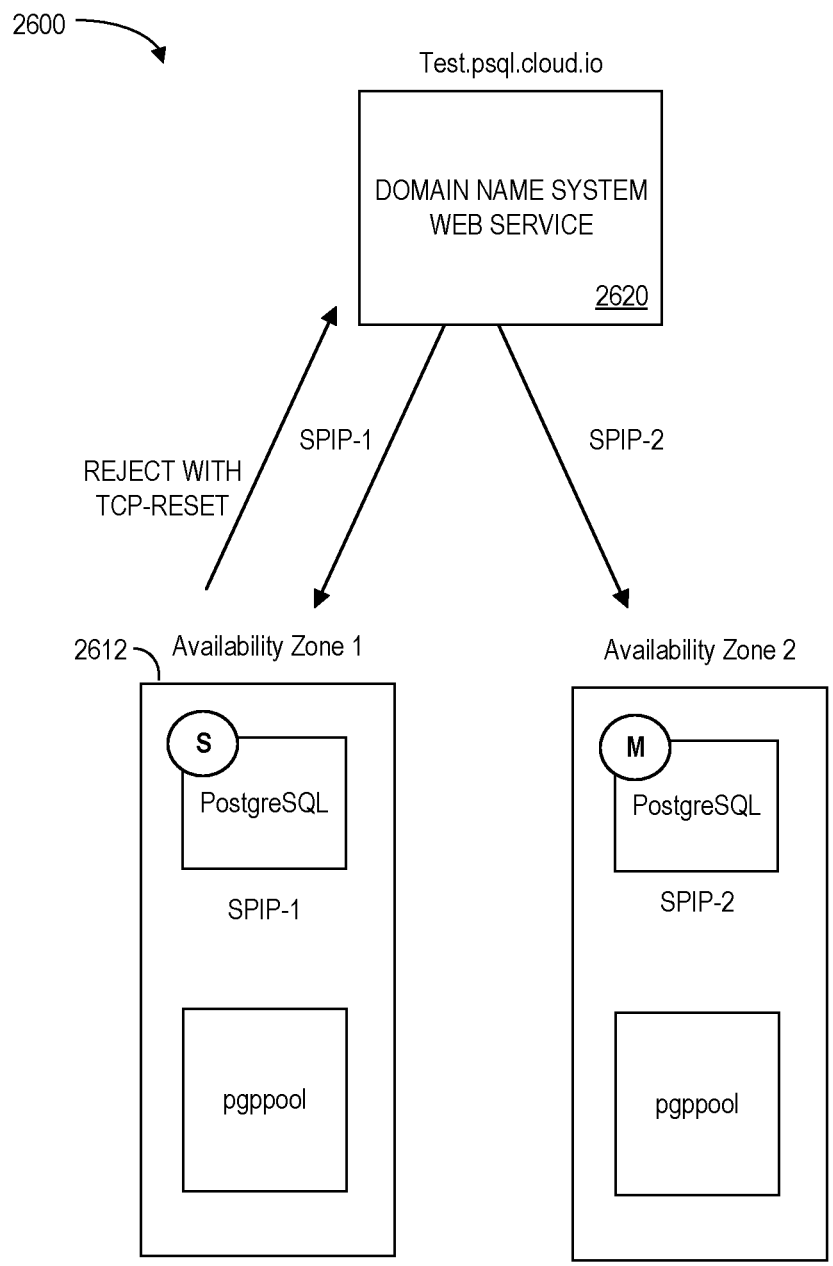
Figure 27:
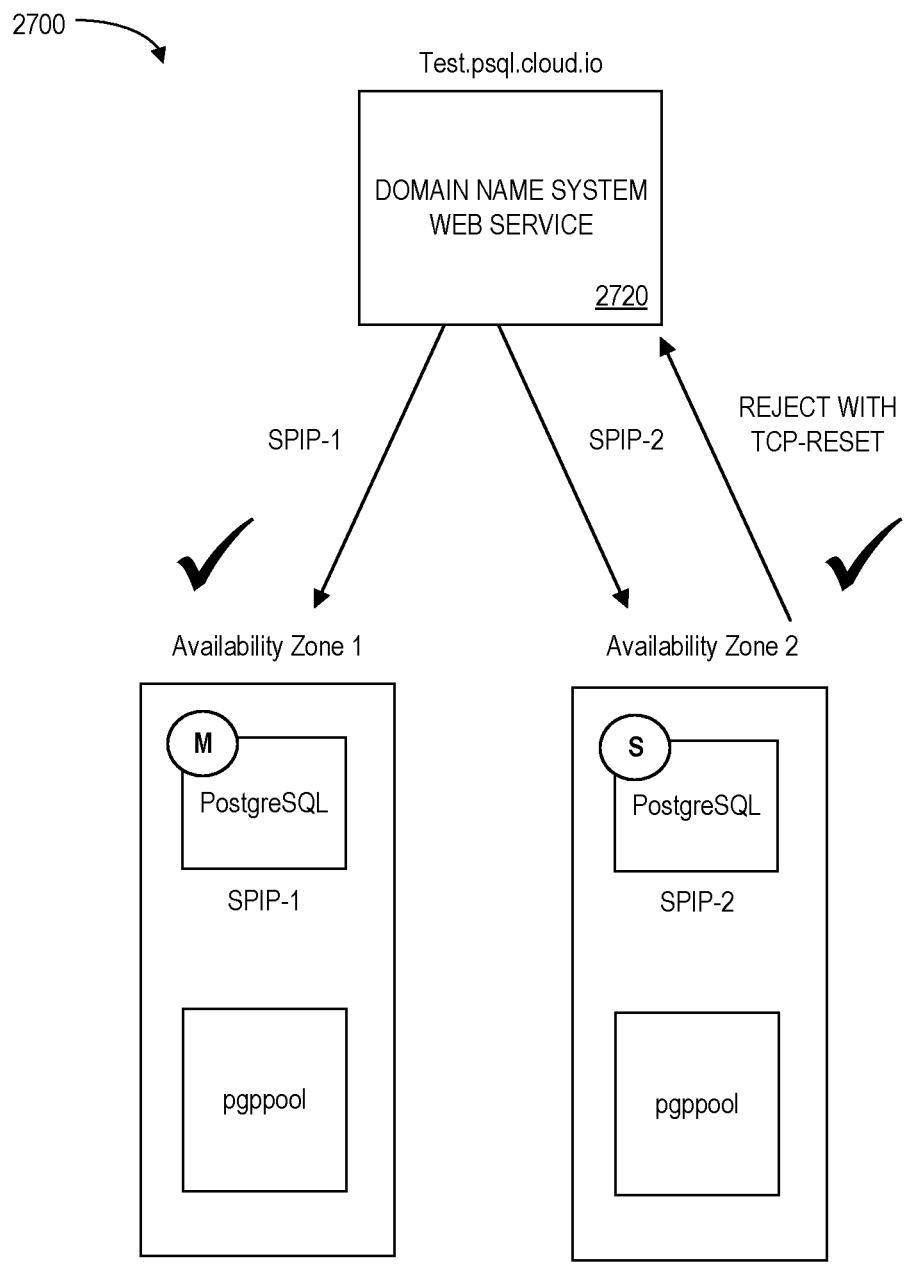
FIGS. 27 and 28 illustrate the use of a health check in accordance with some embodiments.
Figure 28:
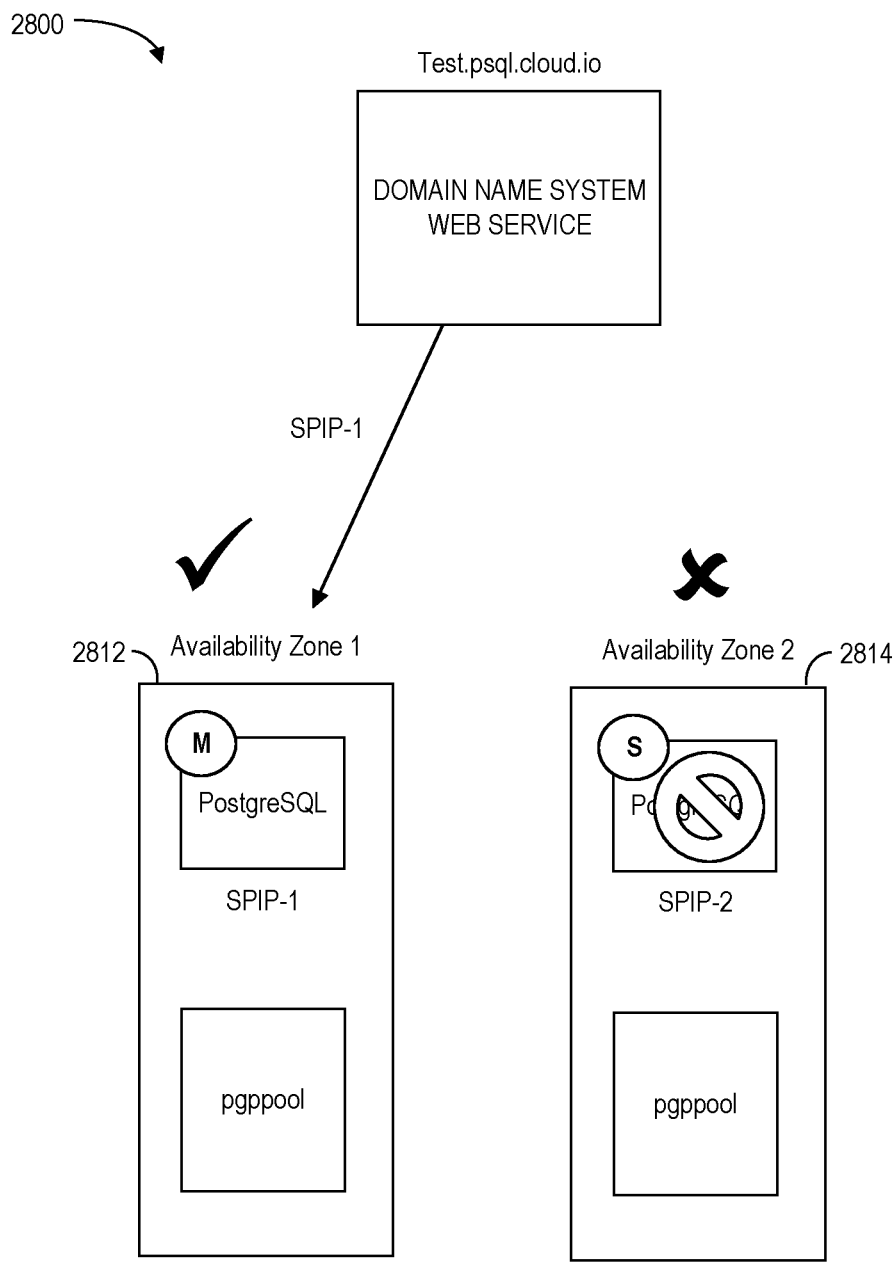

Now suppose that the primary PostgreSQL node goes down as illustrated by the system 2400 of FIG. 24 (in which the current master node in 2412 AZ1 fails). Now, SPIP-1 which belongs to the primary PostgreSQL node is floated to the PGPOOL/controller node. Since both the PostgreSQL node and the controller node are in same zone (the same subnet associated with AZ 1) it is possible to float SPIP-1 in this way. In addition, the IPtable rule present on the other node (the standby node 2414 AZ 2) will be removed. Finally, the standby node will be promoted to primary node using PostgreSQL's native feature as illustrated in the system 2500 of FIG. 25. Note that SPIP-1 has floated to controller node in the same zone 2512. Since there is no process running on port 5432, the OS will reject the connect request coming on PGPOOL (SPIP-1) with "TCP-reset." The Route 53 will now try to connect the other node 2514. Since the other node 2514 has been promoted to primary node, the connection request will go through and client's or customer's request will still be forwarded to the primary node. As illustrated in FIG. 26, when a failed VM 2612 comes back again, it will come back in standby mode. Since this is the standby node, that IPtable rule will be added to reject any request from the DNS web service 2620 with SPIP-1 and port 5432 with "TCP-reset." Thus, during failover the following actions may be performed:

SPIP is floated from the PostgreSQL node to the controller node, and the IPtable rule is deleted from the opposite node.

Both of these operations may happen within a few seconds and overall downtime might be from approximately five to ten seconds. As a result, a single endpoint problem is solved for an AWS multiple AZ architecture.

Now consider the situation where a standby node is abruptly fails or if any of the SPIP is not available. In these cases, the Route 53 record set will not receive a "TCP-reset" packet. If Route 53 does not receive a "TCP-reset" packet and still cannot connect, then it retries the connection for a predetermined period of time (or predetermined number of times). This will be repeated for all new connection requests. As a result, frequent downtime might occur. Note that Route 53 has a feature to set a health check on its registered VMs. While registering PostgreSQL VMs with Route 53, the Route 53 health check will be set with PostgreSQL VMs. The health check can be set on standard port (e.g., 22) or any custom health check endpoint can be also used (which will indicate whether VM is up or down). If the health check corresponding to VM passes, then Route 53 will forward the request to that VM as illustrated by the system 2700 of FIG. 27 (with a checkmark indicating a healthy VM). If a health check fails for a standby node, then it will stop sending requests to the VM corresponding to that health check as illustrated by the system 2800 of FIG. 28 (with an "X" indicating a failed VM 2814). That is, the Route 53 record set will stop connecting to the VM 2814 with SPIP-2 and it will only connect to the primary PostgreSQL node 2812 with SPIP-1 (avoiding frequent downtime). When the standby VM 2814 comes back again, the health check will be "healthy," and the Route 53 record set will again start resolving to SPIP-2.

Figure 29:
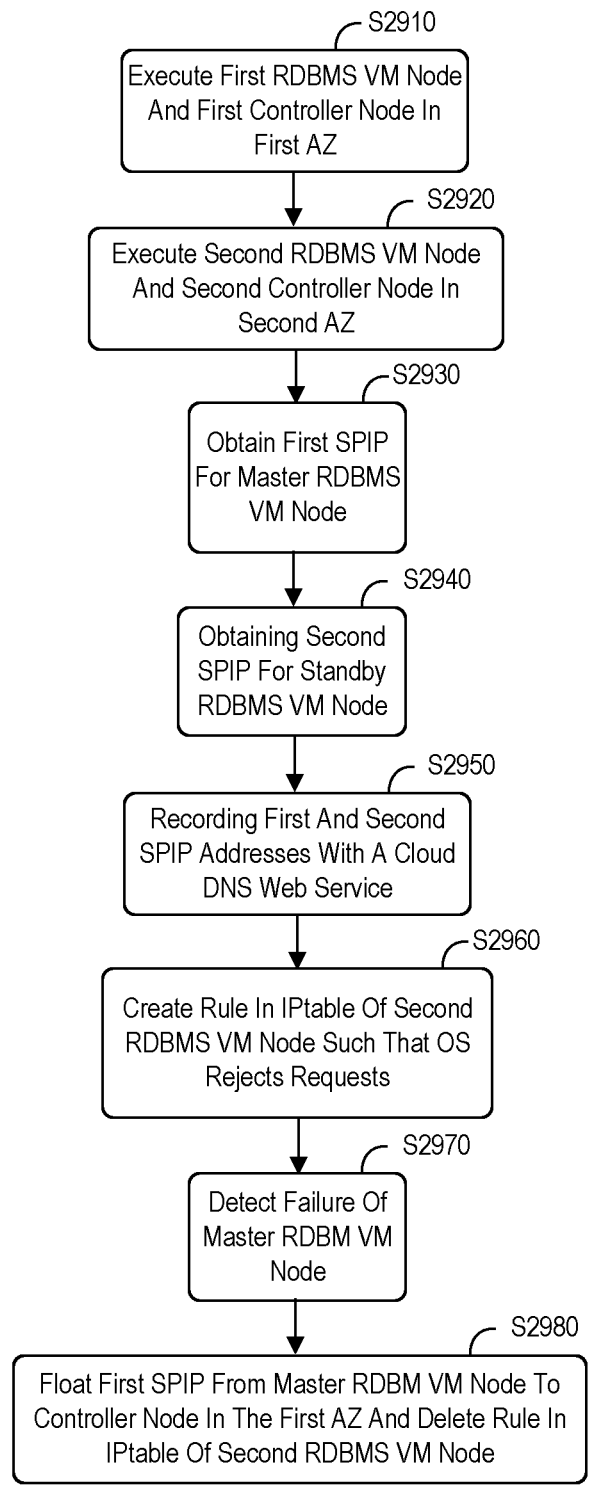
FIG. 29 is an example of a FQDN method for a single endpoint in accordance with some embodiments.

FIG. 29 is a method that might performed by some or all of the elements of any embodiment described herein. At S2910, the system may execute a first RDBMS VM node and a first controller node in a first availability zone. At S2920, the system may execute a second RDBMS VM node and a second controller node in a second availability zone. At S2930, a first SPIP may be obtained for the master RDBMS VM node, and a second SPIP may be obtained for the standby RDBMS VM node at S2940. At S2950, the system may record the first and second SPIP addresses with a cloud DNS web service of a cloud provider. At S2960, the system may create a rule in an IPtable of second RDBMS VM node such that an OS will rejects request. At S2970, a failure of the master RDBMS VM node may be detected (e.g., via a health check or in any other way). Responsive to this detection, at S2980 the system may: (i) float the first SPIP from the master RDBMS VM node to the controller node in the first availability zone, and (ii) delete the rule in the IPtable of second RDBMS VM node.

Figure 30:
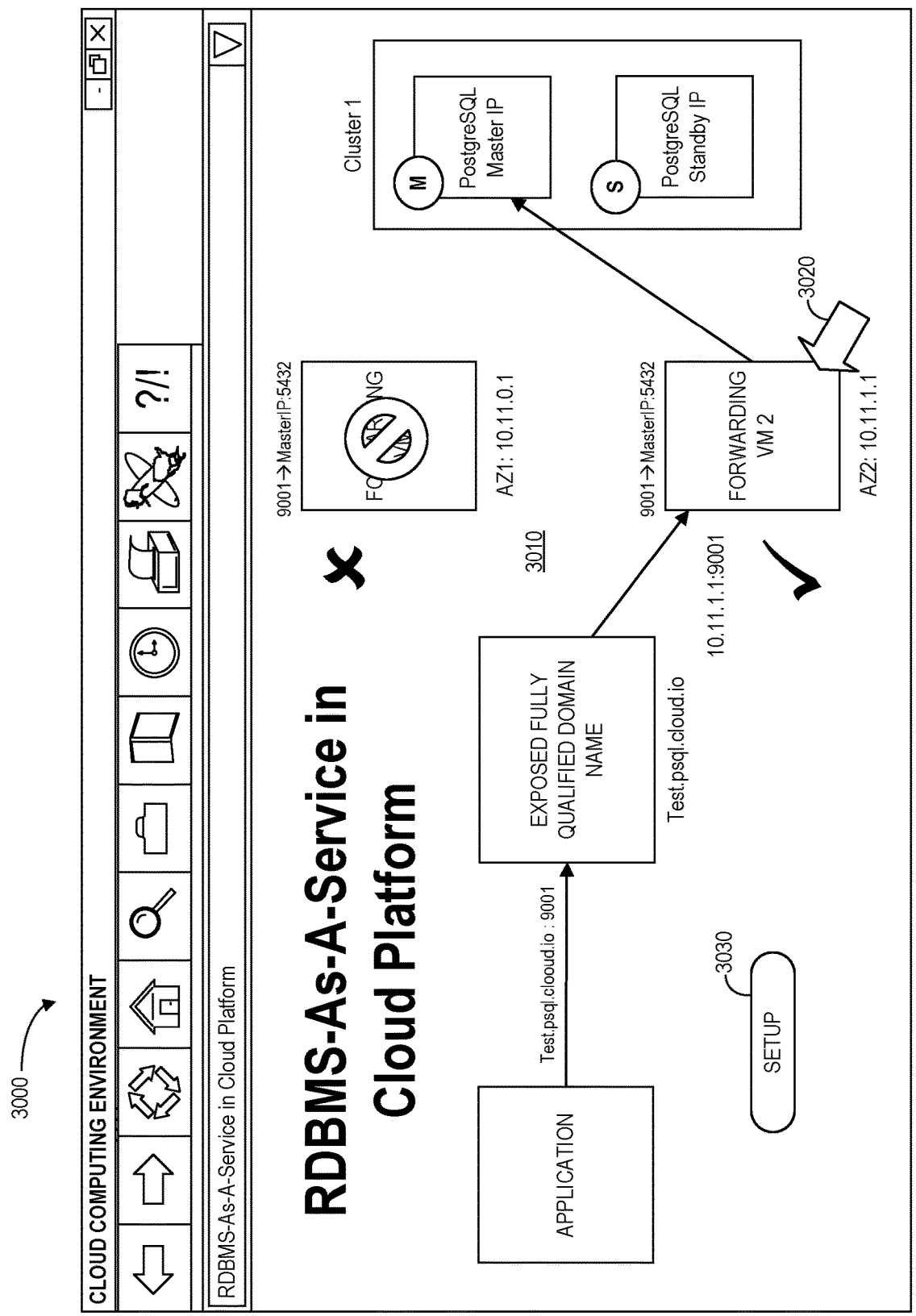
FIG. 30 is a human machine interface display according to some embodiments.

FIG. 30 is a human machine interface display 3000 in accordance with some embodiments. The display 3000 includes a graphical representation 3010 of elements of cloud-based computing environment system for RDBMS as a service implementation. Selection of an element (e.g., via a touch-screen or computer pointer 3020) may result in display of a pop-up window containing various options (e.g., to adjust rules or logic, assign various devices, etc.). The display 3000 may also include a user-selectable "Setup" icon 3020 (e.g., to configure parameters for cloud management/provisioning (e.g., to alter or adjust processes as described with respect any of the embodiments described herein)).

Figure 31:
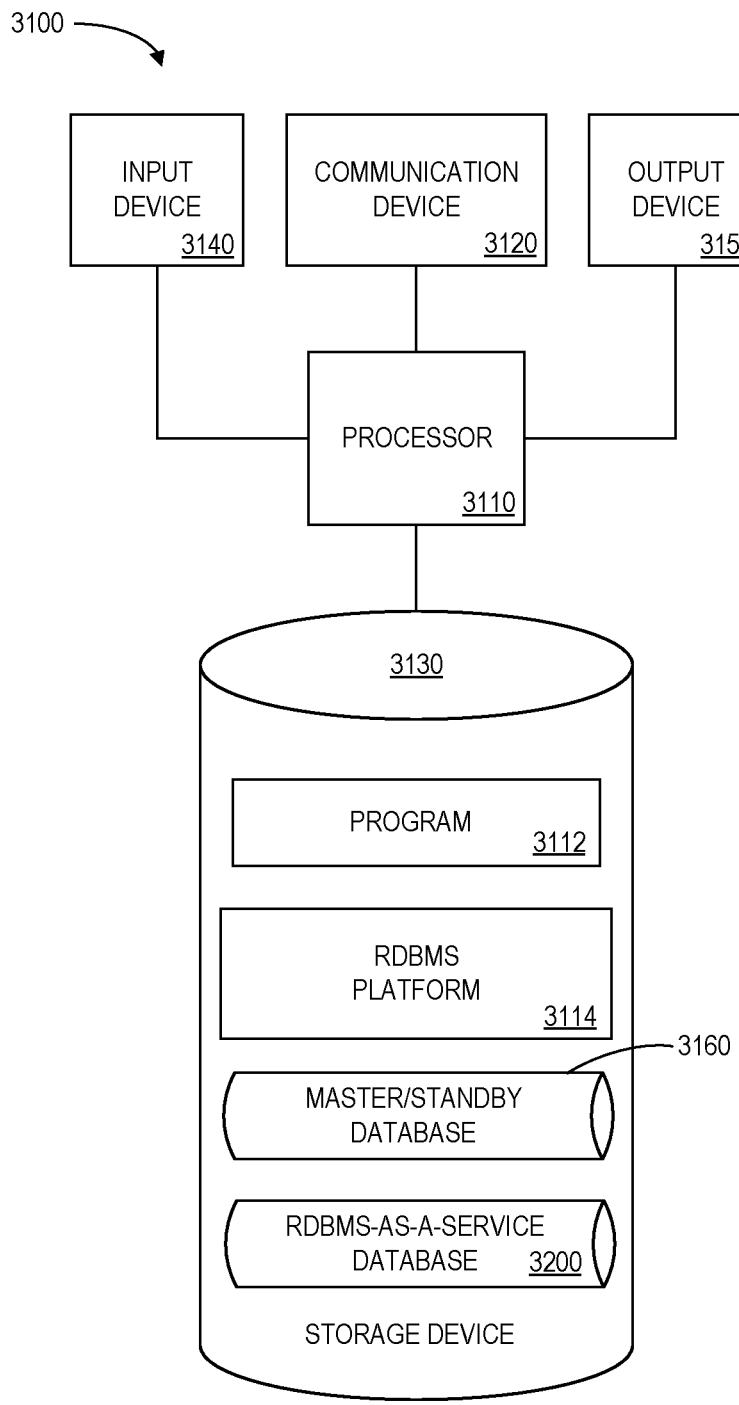
FIG. 31 is an apparatus or platform according to some embodiments.

Note that the embodiments described herein may be implemented using any number of different hardware configurations. For example, FIG. 31 is a block diagram of an apparatus or platform 3100 that may be, for example, associated with the system 200 of FIG. 2 (and/or any other system described herein). The platform 3100 comprises a processor 3110, such as one or more commercially available Central Processing Units ("CPUs") in the form of one-chip microprocessors, coupled to a communication device 3160 configured to communicate via a communication network (not shown in FIG. 31). The communication device 3160 may be used to communicate, for example, with one or more remote user platforms, cloud resource providers, etc. The platform 3100 further includes an input device 3140 (e.g., a computer mouse and/or keyboard to input rules or logic) and/an output device 3150 (e.g., a computer monitor to render a display, transmit alerts to operators when a failure cannot be corrected, and/or create data center reports). According to some embodiments, a mobile device and/or PC may be used to exchange information with the platform 3100.

The processor 3110 also communicates with a storage device 3130. The storage device 3130 can be implemented as a single database or the different components of the storage device 3130 can be distributed using multiple databases (that is, different deployment information storage options are possible). The storage device 3130 may comprise any appropriate information storage device, including combinations of magnetic storage devices (e.g., a hard disk drive), optical storage devices, mobile telephones, and/or semiconductor memory devices. The storage device 3130 stores a program 3112 and/or RDBMS platform 3114 for controlling the processor 3110. The processor 3110 performs instructions of the programs 3112, 3114, and thereby operates in accordance with any of the embodiments described herein. For example, the processor 3110 may execute a first forwarding VM in a first availability zone and having a first IP address and a second forwarding VM in a second availability zone and having a second IP address. The processor 3110 may also record the first and second IP addresses with a cloud DNS web service of a cloud provider such that both receive requests from applications directed to a particular DNS name acting as a single endpoint. The processor 3110 may then provide a RDBMS as a service cluster, including a master RDBMS VM node and a standby RDBMS VM node. An IPtable in each forwarding VM may forward a request having a port value to a cluster port value associated with the master RDBMS VM node. When the processor 3110 detects a failure of the master RDBMS VM node, it may update the IPtables to forward requests having the port value to a cluster port value associated with the standby RDBMS VM node.

In other embodiments, the processor 3110 may execute a first RDBMS VM node and first controller node in a first availability zone and a second RDBMS VM node and second controller node in a second availability zone. The processor may then obtain a first SPIP for the master RDBMS VM node and a second SPIP for the standby RDBMS VM node. The first and second SPIP addresses may be recorded with a cloud DNS web service of a cloud provider and a rule may be created in an IPtable of the second RDBMS VM node such that an OS rejects requests. When the processor 3110 detects a failure of the master RDBMS VM node, it may: (i) float the first SPIP from the master RDBMS VM node to the controller node in the first availability zone, and (ii) delete the rule in the IPtable of the second RDBMS VM node.

The programs 3112, 3114 may be stored in a compressed, uncompiled and/or encrypted format. The programs 3112, 3114 may furthermore include other program elements, such as an operating system, clipboard application, a database management system, and/or device drivers used by the processor 3110 to interface with peripheral devices.

As used herein, information may be "received" by or "transmitted" to, for example: (i) the platform 3100 from another device; or (ii) a software application or module within the platform 3100 from another software application, module, or any other source.

In some embodiments (such as the one shown in FIG. 31), the storage device 3130 further stores a master/standby database 3160 and a RDBMS as a service database 3200. An example of a database that may be used in connection with the platform 3100 will now be described in detail with respect to FIG. 32. Note that the database described herein is only one example, and additional and/or different information may be stored therein. Moreover, various databases might be split or combined in accordance with any of the embodiments described herein.

Figure 32:
FIG. 32 illustrates a web assembly database in accordance with some embodiments.

Referring to FIG. 32, a table is shown that represents the RDBMS as a service database 3200 that may be stored at the platform 3200 according to some embodiments. The table may include, for example, entries defining nodes and/or load balancers in a cluster. The table may also define fields 3202, 3204, 3206, 3208, for each of the entries. The fields 3202, 3204, 3206, 3208 may, according to some embodiments, specify: a RDBMS identifier 3202, a VM identifier 3204, a VM description 3206, and an IP address 3208. The RDBMS as a service database 3200 may be created and updated, for example, when a new RDBMS as a service is provided for an application. According to some embodiments, the RDBMS database 3200 may further store details about a frontend IP address, a backend pool, a load balancing rule, a custom probe, current health status, etc.

The RDBMS identifier 3202 might be a unique alphanumeric label or link that is associated with PostgreSQL as a service or similar service being defined for an application. The VM identifier 3204 might identify a machine to be associated with a cluster for that service (e.g., a controller node VM). The VM description 3206 might indicate if the VM is associated with a master node, standby node, controller node, etc. The IP address 3208 may be private IP address used to identify that particular VM within the cluster.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 33:
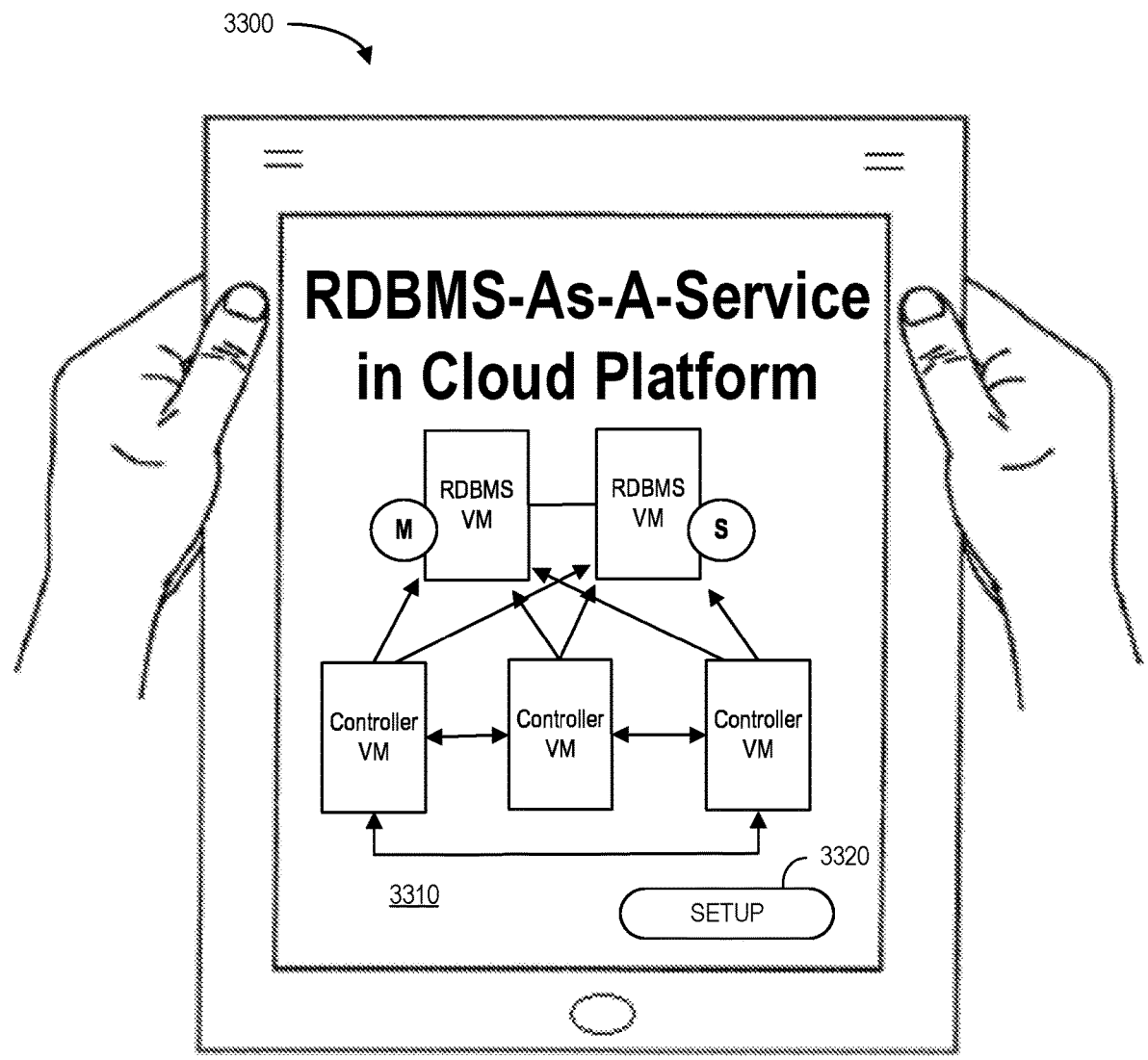
FIG. 33 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 33 shows a tablet computer 3300 rendering a RDBMS-as-a-Service display 3310. The display 3310 may, according to some embodiments, be used to view more detailed elements about components of the system (e.g., when a graphical element is selected via a touchscreen) or to configure operation of the system (e.g., to establish new rules or logic for the system via a "Setup" icon 3320).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud-based computing environment, the system comprising one or more processors coupled to a memory to implement:
   a first forwarding Virtual Machine ("VM") executing in a first availability zone and having a first Internet Protocol ("IP") address;
   a second forwarding VM executing in a second availability zone and having a second IP address, wherein the first and second IP addresses are recorded with a cloud Domain Name Service ("DNS") web service of a cloud provider such that both receive requests from applications directed to a particular DNS name acting as a single endpoint; and
   a service cluster, including:
   a master VM node, and
   a standby VM node,
   wherein an IPtable in each forwarding VM forwards a request having a port value to a cluster port value associated with the master VM node, and further wherein, in response to the master VM node experiencing a failure, the standby VM transmits one or more signals to each forwarding VM to update the IPtables to:
   designate the standby VM node as a new master VM node, and
   forward requests having the port value to a cluster port value associated with the new master VM node.

2. The system of claim 1, wherein the service cluster is associated with a Relational Database Management System ("RDBMS") as a service cluster, the master VM node comprises a master RDBMS node, and the standby node comprises a standby RDBMS node.

3. The system of claim 2, wherein the RDBMS as a service comprises PostgreSQL as a service.

4. The system of claim 2, wherein, upon a return of the original master RDBMS VM node from failure, arranging for that node to execute in standby mode.

5. The system of claim 2, wherein the forwarding VMs support multiple RDBMS as a service clusters.

6. The system of claim 5, wherein each forwarding VM IP table includes multiple rules, each forwarding a different port value to a cluster port value associated with a master RDBMS VM node of a different cluster.

7. The system of claim 1, wherein, upon failure of the first forwarding VM, requests from applications are only directed to the second forwarding VM.

8. The system of claim 7, wherein failure of the first forwarding VM is determined via a health check implemented via the cloud DNS web service.

9. The system of claim 8, wherein upon recovery of the first forwarding VM from failure, the IP table rules of the second forwarding VM are copied to the first forwarding VM IP table.

10. The system of claim 1, wherein the master VM node and the standby VM mode execute in different availability zones.

11. The system of claim 1, wherein additional forwarding VMs execute in additional availability zones to support the service cluster.

12. A non-transitory, computer readable medium having instructions stored thereon, the instructions being executable by one or more processors to perform a method comprising:
  executing a first forwarding Virtual Machine ("VM") in a first availability zone and having a first Internet Protocol ("IP") address;
  executing a second forwarding VM in a second availability zone and having a second IP address;
  recording the first and second IP addresses with a cloud Domain Name Service ("DNS") web service of a cloud provider such that both receive requests from applications directed to a particular DNS name acting as a single endpoint;
  providing a Relational Database Management System ("RDBMS") as a service cluster, including a master RDBMS VM node and a standby RDBMS VM node;
  forwarding, by an IPtable in each forwarding VM, a request having a port value to a cluster port value associated with the master RDBMS VM node;
  detecting a failure of the master RDBMS VM node; and
  responsive to said detecting, the standby RDBMS VS transmitting one or more signals to each forwarding VM to update the IPtables to:
    designate the standby RDBMS VM node as a new master RDBMS VM node, and
    forward requests having the port value to a cluster port value associated with the new master RDBMS VM node.

13. The medium of claim 12, wherein the RDBMS as a service comprises PostgreSQL as a service.

14. The medium of claim 12, wherein, upon a return of the original master RDBMS VM node from failure, arranging for that node to operate in standby mode.

15. The medium of claim 12, wherein the forwarding VMs support multiple RDBMS as a service clusters.

* * * * *